United States Patent [19]
Staples et al.

[11] Patent Number: 5,889,845
[45] Date of Patent: *Mar. 30, 1999

[54] SYSTEM AND METHOD FOR PROVIDING A REMOTE USER WITH A VIRTUAL PRESENCE TO AN OFFICE

[75] Inventors: Leven E. Staples, Granbury; W. B. Barker; Kenneth L. Witt, both of San Antonio, all of Tex.

[73] Assignee: Data Race, Inc., San Antonio, Tex.

[ * ] Notice: The term of this patent shall not extend beyond the expiration date of Pat. No. 5,764,639.

[21] Appl. No.: 740,775

[22] Filed: Nov. 1, 1996

Related U.S. Application Data

[63] Continuation of Ser. No. 559,472, Nov. 15, 1995, Pat. No. 5,764,639.

[51] Int. Cl.$^6$ ..................................................... H04M 5/06
[52] U.S. Cl. ................ 379/211; 379/93.01; 379/100.08; 379/265
[58] Field of Search .................................... 379/265, 266, 379/309, 207, 201, 67, 89, 93.01, 93.24, 100.01, 100.08

[56] References Cited

U.S. PATENT DOCUMENTS

| | | | |
|---|---|---|---|
| 4,674,115 | 6/1987 | Kaleita et al. | 379/201 |
| 5,291,551 | 3/1994 | Conn et al. | 379/265 |
| 5,384,831 | 1/1995 | Creswell et al. | 379/67 |
| 5,568,489 | 10/1996 | Yien et al. | 379/89 |
| 5,598,536 | 1/1997 | Slaughter, III et al. | |
| 5,602,846 | 2/1997 | Holmquist et al. | |
| 5,636,218 | 6/1997 | Ishikawa et al. | |

FOREIGN PATENT DOCUMENTS

| | | |
|---|---|---|
| 0 367 455 A2 | 5/1990 | European Pat. Off. |
| 0 536 949 A2 | 4/1993 | European Pat. Off. |

OTHER PUBLICATIONS

Patent Abstracts of Japan, Publication No. 60030248, dated Feb. 15, 1985.

Dieter Hochreuter, Michael Nash, "Hicom 300—eine Vielfalt neuer Möglichkeiten," Telcom Report (Siemens), vol. 18, No. 5, Oct. 1995, München, DE, XP000543153, pp. 265–267. (No Translation).

International Search Report for PCT/US96/16455 dated Apr. 24, 1997.

*The ITU Telecommunication Standardization Sector (ITU–T)*, Draft V.DSVD–S (Draft of Dec. 8, 1995), Copyright 1996, 22 pages.

*The ITU Telecommunication Standardization Sector (ITU–T)*, Draft V.75 (Draft of Feb. 2, 1996), pp. 1–23.

*Teltone OfficeLink*, Teltone advertising brochure (Pub. Jan. 10, 1995).

Primary Examiner—Ahmad F. Matar
Attorney, Agent, or Firm—Conley, Rose & Tayon; Jeffrey C. Hood

[57] ABSTRACT

A system and method for enabling a remote user to maintain a virtual presence at a corporate office and behave substantially as if the user were physically present at the corporate office. First the remote user establishes a virtual presence connection at the corporate office, including providing identification and security information. Once the remote user is connected, the virtual presence server instructs the corporate PBX to automatically forward all calls to the remote user. The virtual presence server also routes email, faxes, and LAN data to the remote user. The virtual presence server also extends the corporate PBX and corporate LAN features to the remote user, just as if the remote user were physically located in the corporate office. According to the invention, the remote user makes outgoing telephone calls, sends faxes, transmits data, sends email and performs Internet access as if the remote user were physically present in the corporate office. The virtual presence server and/or the user communication device also performs a call forwarding operation to call forward telephone calls made to the user's home to the virtual presence server at the corporate office. These calls are then routed through the virtual presence server to the user's home. Thus the user can receive home telephone calls while the user is connected to the corporate office, wherein the home telephone calls are received on the same telephone line which is being used for the virtual presence connection.

99 Claims, 21 Drawing Sheets

SYSTEM AND METHOD FOR PROVIDING A REMOTE USER WITH A VIRTUAL PRESENCE TO AN OFFICE

CONTINUATION DATA

This is a continuation of U.S. application Ser. No. 08/559,472 titled "System and Method for Providing a Remote User with a Virtual Presence to an Office" and filed Nov. 15, 1995, whose inventors are Leven E. Staples, W. B. Barker, and Kenneth L. Witt, which issued on Jun. 9, 1998 as U.S. Pat. No. 5,764,639.

FIELD OF THE INVENTION

The present invention relates a system and method which provides connectivity between one or more remote users and a corporate office, wherein the remote users have a virtual presence at the corporate office, including access to the facilities and features provided by the corporate office telephone system and local area network, wherein the invention also provides the ability to receive home telephone calls on the same communication line used for the virtual presence connection.

DESCRIPTION OF THE RELATED ART

Connectivity between remote workers and an office is becoming increasingly important in today's business climate. Business people who travel, commonly referred to as "road warriors", desire to "stay connected" to the corporate office as much as possible. In addition, a current trend in business is the "telecommuter", e.g., an employee who works primarily at home and is remotely connected to the corporate office. Another recent trend in business is referred to as the "remote small office" (RSO) or "branch office" (BO), wherein a group of workers or employees are in a location remote from the company's headquarters or corporate office and are electronically connected to the corporate office.

In each of the above situations, the remote individuals require remote and transparent connectivity to the corporate office, including connectivity to the corporate office local area network (LAN) and the corporate office private branch exchange (PBX) or Centrex Facility. In the present disclosure, a PBX and a Centrex Facility, as well as other types of telephony server systems, are referred to collectively as a PBX for convenience. Further, the remote individuals desire a "virtual presence" at the corporate office, wherein the remote users operate remotely just as if they were physically located in the corporate office.

As corporations move away from mainframe based systems to PC based systems and local area networks (LANs), the options for remote connectivity have improved. In general, personal computers and LANs facilitate remote access to computing resources. Remote connectivity is also made possible with the arrival of affordable, reliable, digital telecommunications services and inexpensive network hardware. Currently, a variety of digital telecommunications services now support remote connections to enterprise networks, among these being Frame Relay, ISDN, Digital Data Service, and T1.

Current remote connectivity software solutions provide remote access between computer systems at different physical locations. For example, one class of remote connectivity software, referred to as "remote control software", allows a user at a local computer system to control and manipulate a remote computer system as if the user were present at the remote computer system. The user enters commands into the local computer, either through a command line or a graphical user interface (GUI), and software executing on the local computer transmits the commands from the local computer to the remote computer. The remote computer executes the commands and provides the output or response back to the local computer.

Applicant is aware of products from various PBX vendors which provide a degree of connectivity to the remote office based upon certain types of transmission media, such as ISDN. Applicant is specifically aware of a product from Siemens Rolm referred to as the Rolm Officepoint Communications system, which provides an integrated ISDN system for remote and small offices. Applicant is also aware of products offered by various remote access vendors which provide data only connectivity to the remote office. These products generally do not address the voice communication requirements of the user. Further, these products do not address the particular requirements of the road warrior.

Therefore, a system and method is desired which provides remote connectivity between a remote computer or communications device and a corporate office, wherein the system provides remote and transparent telephony and data access to the corporate office Private Branch Exchange (PBX) and local area network (LAN). A system and method is also desired which provides a remote user with a virtual presence at the corporate office, including access to all of the facilities and features of the corporate office PBX and LAN. It would also be highly desirable for a user to be able to receive home telephone calls while the user has a virtual presence connection to the corporate office. It would further be desirable for the user to be able to receive home telephone calls on the same telephone line or communication line being used for the virtual presence connection.

SUMMARY OF THE INVENTION

The present invention comprises a system and method for enabling a remote user to maintain a virtual presence at a corporate office. The present invention allows a remote user to connect to a corporate office and behave just as if the user were physically present at the corporate office. Thus the remote user's telephone behaves as a PBX extension. In addition, the remote user may send and receive faxes and email, have Internet access and maintain LAN connectivity, just as if the user were present at the corporate office.

The remote computer system includes a user telephony communications device, and the remote computer executes virtual presence software according to the present invention. The corporate office includes a virtual presence server according to the invention which connects to the corporate PBX and also to the corporate LAN. The virtual presence server executes software which enables the remote user to maintain a virtual presence at the corporate office.

When the remote user desires to establish a virtual presence at the corporate office, the remote user directs the user telephony communications device to dial the virtual presence server and establish a connection. This includes providing identification information and security information to the virtual presence server.

Once the remote user is connected, the virtual presence server instructs the corporate PBX to automatically forward the remote user's office calls to the remote user at the remote location. The virtual presence server preferably performs a remote access call forwarding operation to direct calls that are made to the remote user's office telephone number to be forwarded to the virtual presence server. The virtual presence server then routes these forwarded telephone calls to the user telephony communication device being used by the remote user. Thus, external parties which call the user at the office are automatically routed to the remote user by the virtual presence server.

The virtual presence server also routes email, faxes, and LAN data to the remote user. The virtual presence server also extends the corporate PBX and corporate LAN features to the remote user, just as if the remote user were physically located in the corporate office.

The present invention enables the concept of virtual presence or "telepresence", whereby a user at a remote location has the full capabilities and user interfaces of the corporate office just as if the user were physically located at the corporate office. Thus the telephone of the remote user mirrors the telephone the user sees at the corporate office, including substantially the same button configurations at substantially the same locations and performing substantially the same functions. According to the present invention, the remote user dials the local extension number or DID (direct inward dialing) number of co-workers in the corporate office, and can be reached with a local extension number, just as if the remote user were physically located in the corporate office.

According to the invention, the remote user makes outgoing telephone calls, sends faxes, transmits data, sends email and performs Internet access as if the remote user were physically present in the corporate office. Likewise, incoming calls, faxes, data transmissions and email received at the corporate office are routed to the remote user as if the remote user were physically present in the corporate office.

Therefore, a co-worker or external party who telephones the user at the corporate office, or sends email or a fax to the user at the corporate office, is unaware that the user is actually not physically located at the corporate office, but rather is at a remote location. In general, a secretary or receptionist located just outside the user's physical corporate office location is unable to discern, without opening the door, whether the user is located in his office at the corporate office or at a remote location.

The present invention includes methods for disconnecting and re-establishing virtual presence to reduce message rate charging. When a connection first occurs, the system determines if message rate charging is in effect. If so, and if the user desires temporary disconnects, the remote computer system monitors activity and disconnects after certain elapsed periods of inactivity. When the remote user desires to contact the corporate office, or the virtual presence server desires to route data to the remote user, then the respective system automatically and transparently reconnects to reestablish virtual presence and perform the communication. These reconnects preferably occur transparently to the user, and thus a virtual presence is maintained from the user's perspective, even during temporary disconnects.

For the telecommuter, the present invention optionally performs a remote access call forwarding operation to instruct the telephone company Central Office to automatically route calls made to the telecommuter's home number, i.e., personal calls, to the corporate office. These calls are forwarded to the virtual presence server as described above and are then routed to the telecommuter's home by the virtual presence server. Thus when a telecommuter is connected to the corporate office according to the virtual presence system of the invention, an external party who attempts to call the telecommuter at home is not blocked out, but rather is routed through the corporate office virtual presence server to the telecommuter.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
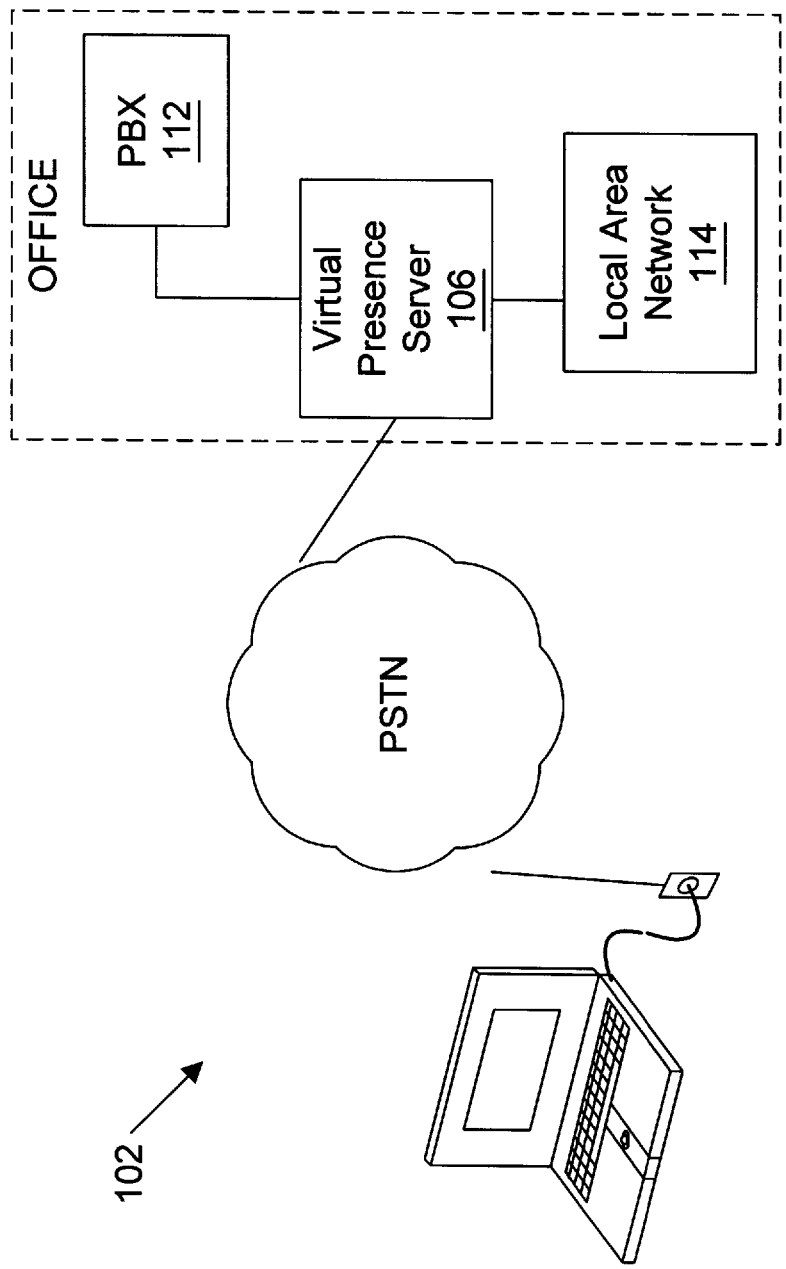
FIGS. 1 and 2 illustrate a system wherein a remote user maintains a virtual presence to a corporate office according to the present invention.

FIG. 1—Virtual Presence System

Referring now to FIG. 1, a block diagram of a Remote Connectivity and Virtual Presence System according to the present invention is shown. As shown, a user who is remote from his/her "corporate office" utilizes a computer system or other communications device, referred to generally as computer system 102, to communicate and/or connect with the corporate office, also referred to as the home office. In the present disclosure, the term "corporate office" is intended to generally mean an office location or a data site where a remote user is desired to be connected. In general, the corporate office will be a headquarters office or corporate office, a government agency office, or another type of office, to which the user desires a "virtual presence."

The remote user preferably uses a computer system, such as laptop 102, to connect to the corporate office. The remote user may also use other types of communication devices, such as a personal digital assistant (PDA) or a cellular phone, as desired. The computer system 102 includes a user telephony communication device 104 (FIG. 2) according to the present invention which provides transparent telephone and data connectivity and virtual presence to the corporate office. The user telephony communication device 104 preferably comprises a hardware card and/or software comprised in the computer system 102 which facilitate the remote connectivity and virtual presence.

The user telephony communication device 104 couples through a communication mechanism or channel to a virtual presence server 106 at the corporate office, i.e., the office where the user desires to have a "virtual presence" or have "telepresence". In the preferred embodiment, as shown, the communication mechanism is the public switched telephone network (PSTN), using either conventional analog transmission or ISDN (Integrated Services Digital Network) transmission. In the present disclosure, the term "public switched telephone network" (PSTN) includes any of various types of communications mechanisms, including analog or digital telephony transmission as mentioned above, DSL (Digital Subscriber Line), such as ADSL or HDSL, ATM (Asynchronous Transfer Mode), FDDI (Fiber Distributed Data Networks), and T1 lines, among others.

The virtual presence server 106 preferably supports one or more user telephony communication devices 104 via the public switched telephone network (PSTN). The virtual presence server 106 at the corporate office preferably supports a mixture of simultaneous analog and ISDN connections for connecting to various user telephony communication devices 104. The virtual presence server 106 is preferably a high performance computer system executing virtual presence software according to the invention.

The virtual presence server 106 interfaces to a telephony server 112, such as a private branch exchange (PBX) or Centrex unit in the corporate office. In embodiments where the corporate office includes a call server instead of a conventional PBX, the virtual presence server 106 connects to the call server. In the present disclosure, the term "telephony server" is intended to include a PBX, Centrex system, and other devices or systems which perform telephony switching services or functions. Also, the term "PBX" is used herein to be equivalent to "telephony server" for convenience.

In one embodiment, the virtual presence server 106 performs the functions of a call server as well as a virtual presence server. For example, the virtual presence server 106 in one embodiment comprises a SCSA (Signal Computing System Architecture) or MVIP server for performing call management functions as well as virtual presence functions.

The virtual presence server 106 also interfaces to a local area network (LAN) 114 at the corporate office. The LAN 114 may use Ethernet, Token Ring, or other types of protocols. The LAN may also use the Isochronous Ethernet (IsoEthernet) protocol, which is IEEE specification 802.9a.

Figure 2:
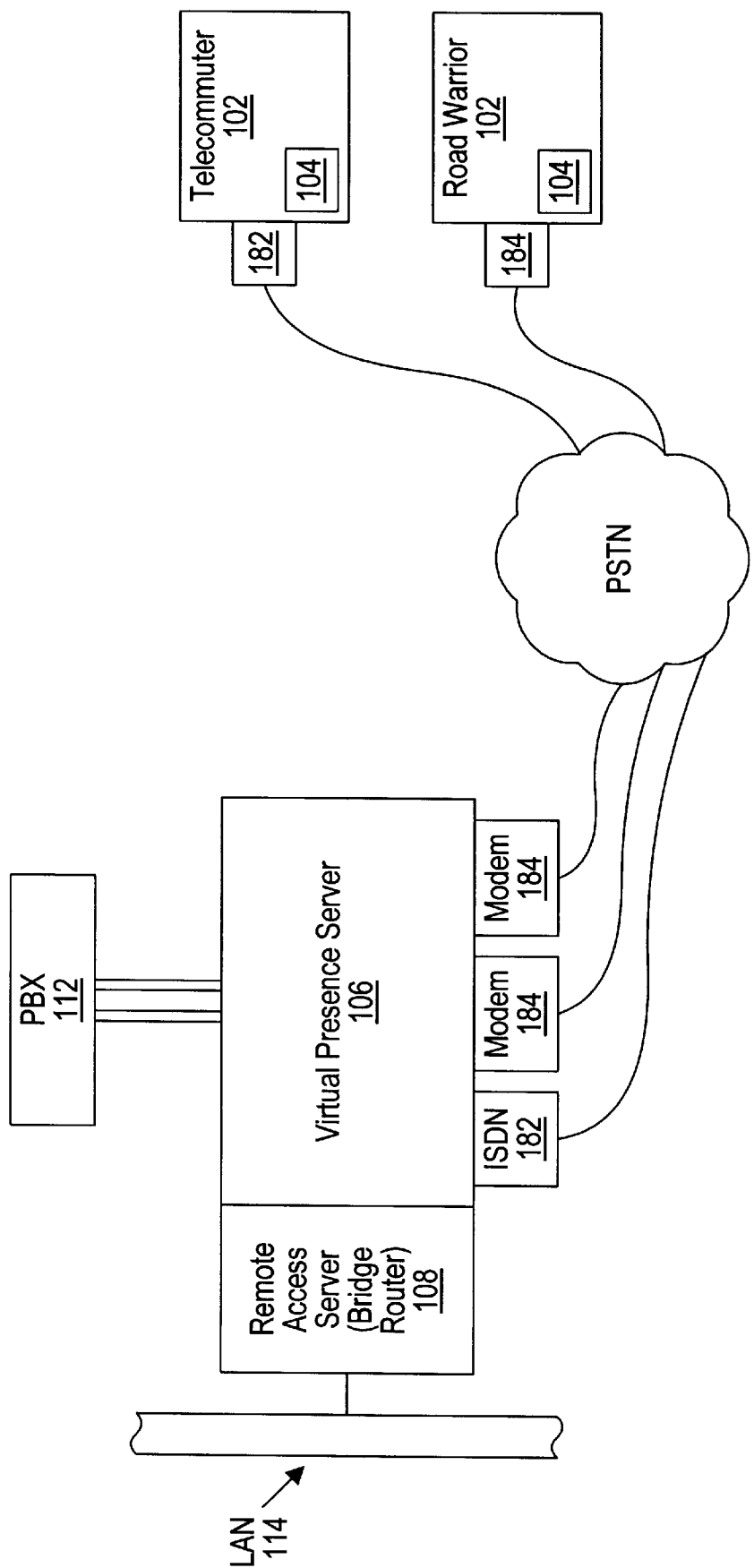

Referring now to FIG. 2, the virtual presence server 106 preferably includes one or more analog modems 184 for communicating analog signals over telephone lines, and one or more ISDN terminal adapters 182 for ISDN communications. It is noted that the virtual presence server 106 may include only analog modems 184 or only ISDN terminal adapters 182, or may include a combination. The virtual presence server 106 may include other types of communications devices and/or use other types of communications media, as desired.

As shown in FIG. 2, the corporate office may also include a remote access server 108 and/or a bridge router for performing more conventional remote access functions. Alternatively, the virtual presence server 106 includes remote access software for performing remote accessing functions in addition to the virtual presence functions of the present invention.

As shown, the remote user may either be a telecommuter or a road warrior, or may be a resident in a branch office, also referred to as a remote small office. As noted above, the remote user preferably uses a computer system 102 which includes a user telephony communication device 104. The user telephony communication device 104 comprised in the remote computer system 102 and used by the remote user may comprise either an analog modem 184 or an ISDN terminal adapter 182, or another type of communications device, as mentioned above. It is noted that the computer 102 and/or user telephony communication device 104 may connect to the PSTN using any of various communications devices and any of various communications media, as desired. In the present disclosure, the term "user telephony communications device" is intended to include analog modems, ISDN terminal adapters, ADSL or ATM devices, and any of various other types of communications devices which use any of various types of communications media.

The virtual presence server 106 located at the corporate office connects to the corporate PBX 112 as one or more extensions and connects to the corporate LAN 114 as one or more remote terminals, LAN nodes, or a separate LAN segment. The virtual presence server 106 then provides these features over the public switched telephone network (PSTN) to a remote site, i.e., to the remote user. Thus, the virtual presence server 106 of the present invention operates to extend PBX features, as well as LAN features, to the remote users. It is noted that the system shown in FIGS. 1 and 2 does not include a key system or PBX intervening between the virtual presence server 106 and the remote users.

The user telephony communication device 104 in the computer system 102, as well as the virtual presence server 106 at the corporate office, allow a remote user to seamlessly access and use resources at the corporate office, such as the corporate office private branch exchange (PBX) 112 and local area network (LAN) 114. Thus, a remote user with a virtual presence connection according to the present invention has all of the facilities and features provided by the PBX 112 and LAN 114 at the corporate office while working from a remote location.

Further, the present invention enables the concept of virtual presence or "telepresence", whereby a user at a remote location has the full capabilities and user interfaces of the corporate office just as if the user were physically located at the corporate office. In other words, the system of the present invention allows the remote user to have a virtual presence at the corporate office as if the user were actually present at the corporate office.

Thus the telecommuter or road warrior using a virtual telephone on his/her computer "sees" a virtual telephone that optionally substantially mirrors the telephone the user sees at the corporate office, including substantially the same button configurations at substantially the same locations and performing substantially the same functions. In one embodiment, the user configures the virtual telephone to provide different and/or more advanced features than the telephone at the corporate office.

Typically, a person physically located in a corporate office dials a local extension number or DID (direct inward dialing) number, such as an N digit extension number, to call a co-worker in the corporate office. According to the present invention, the remote user dials the same local extension number of a co-worker in the corporate office, just as if the remote user were physically located in the corporate office. Similarly, a co-worker in the corporate office dials the local extension of the remote user and accesses the remote user, just as if the remote user were physically located in the corporate office.

According to the invention, the remote user makes outgoing telephone calls, sends faxes, transmits data, sends email and performs Internet access as if the remote user were physically present in the corporate office. Likewise, incoming calls, faxes, data transmissions and email received at the corporate office are routed to the remote user as if the remote user were physically present in the corporate office.

Incoming calls are preferably automatically routed to the remote user. In the preferred embodiment, once the remote user is connected, the virtual presence server instructs the corporate PBX or telephony server to automatically forward the remote user's office calls to the remote user at the remote location. The virtual presence server preferably performs a remote access call forwarding (RACF) operation to direct calls that are made to the remote user's office telephone number to be forwarded to the virtual presence server. The virtual presence server then routes these forwarded telephone calls to the user telephony communication device being used by the remote user. Thus, external parties which call the user at the office are automatically routed to the remote user by the virtual presence server.

Faxes may also be automatically routed to the remote user if the remote user has a personal fax machine and/or personal fax number at the corporate office. It is noted that, for faxes to be automatically routed from the corporate office to the remote user, the corporate office is not required to have a physical fax machine, but is only required to have a direct number to receive faxes.

Therefore, a co-worker or other party who telephones the remote user at the corporate office, or sends email, data or a fax to the remote user at the corporate office, is unaware that the user is actually not physically located at the corporate office, but rather is at a remote location. In general, a secretary or receptionist located just outside the user's physical corporate office location is unable to discern whether the user is located in his office at the corporate office or at a remote location. Thus the remote user maintains a virtual presence which is "just like being there".

Figure 3:
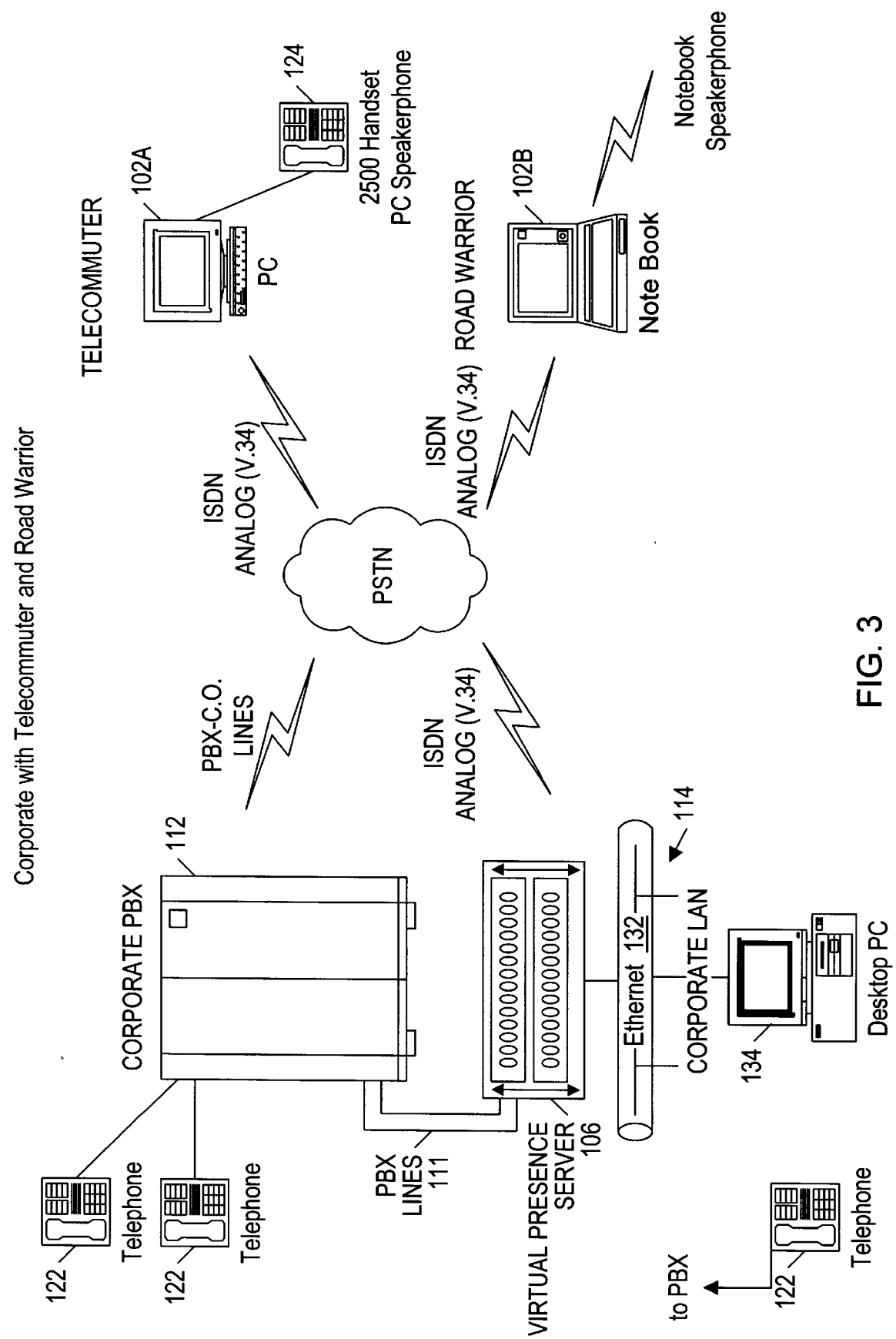
FIGS. 3–5 illustrate various embodiments of the virtual presence system of the present invention.
Figure 4:
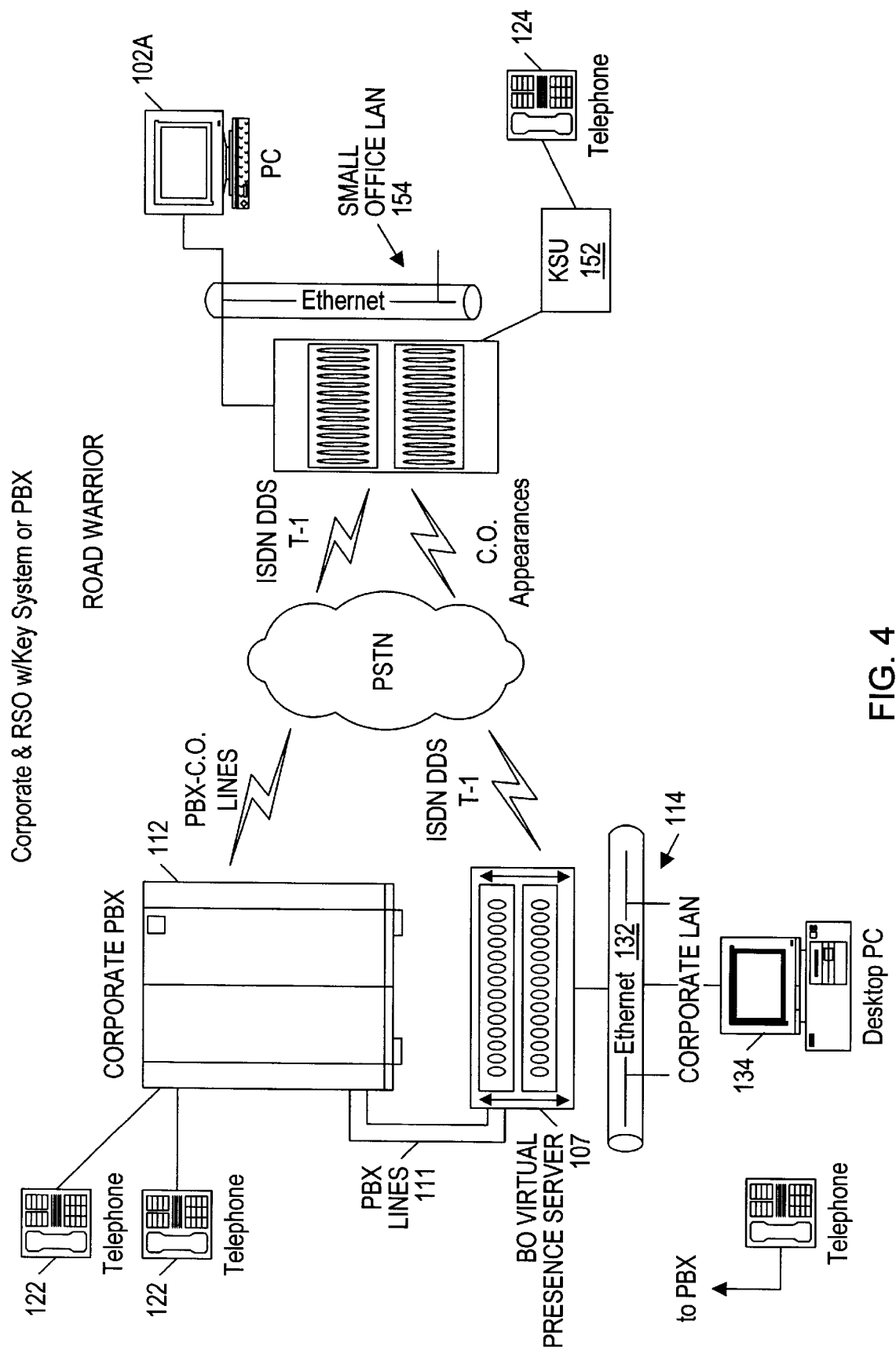
Figure 5:
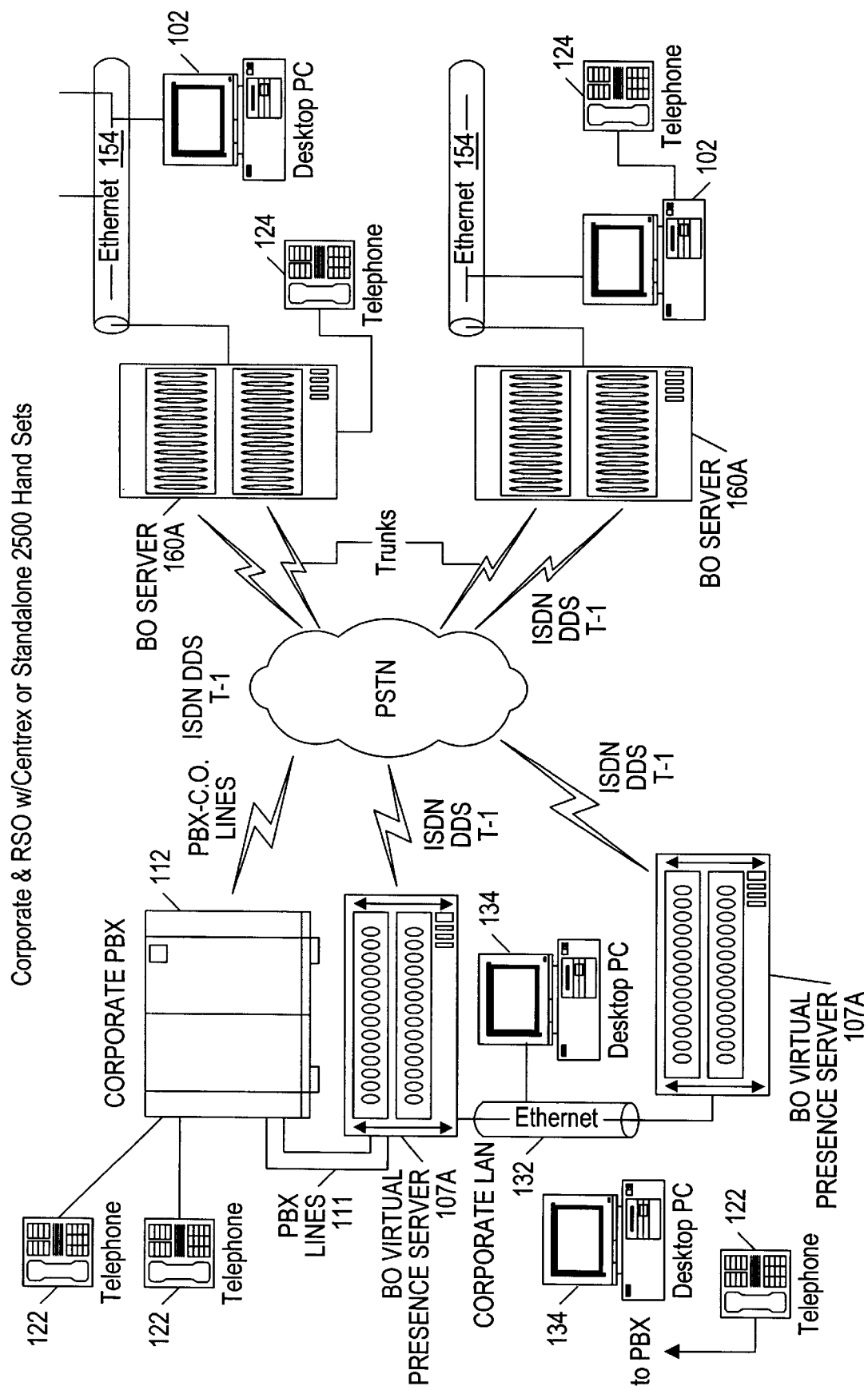

FIGS. 3–5: Embodiments of the Invention

Referring now to FIGS. 3–5, various embodiments of the present invention are shown. As shown, the system of the present invention may be used for various types of remote users.

1. FIG. 3: Telecommuters and Road Warriors

Referring now to FIG. 3, an embodiment used for telecommuters and road warriors is shown. For a user who is a "telecommuter", i.e., a user who is working at home and remotely connects to the corporate office, the telecommuter may operate with either a desktop or portable computer system, or optionally with another type of communications device. FIG. 3 illustrates a telecommuter operating with a desktop computer system, designated as 102A. If the telecommuter operates with a desktop computer system 102A, the user telephony communication device 104 is preferably an add-in card to an expansion bus of the computer system 102A, such as a PCI (Peripheral Component Interconnect) card or AT bus card, or may be an external device.

As shown in FIG. 3, in one embodiment a telephone instrument 124 is connected to the computer system 102A. Alternatively, or additionally, the computer system 102A executes software which presents a "virtual telephone" on the video screen of the computer system 102A. The virtual telephone executing on the computer system preferably uses the computer's speakerphone, or the computer's built-in microphone and speakers, as the voice transmitter and receiver for the virtual telephone.

For a "road warrior", i.e., a business traveler operating with a portable or notebook computer 102B, the user telephony communication device 104 preferably comprises a PC Card, or the user telephony communication device logic is hardwired to the computer motherboard. Users who are "road warriors", i.e., business users who travel and desire to "stay connected" to the corporate office, generally use a portable computer system 102B or a portable communications device (not shown). Thus, for road warriors, the user telephony communication device 104 preferably comprises a PCMCIA card, also referred to as a PC Card, adapted for insertion into a PCMCIA slot of the portable computer system 102B. Also, ink if the telecommuter uses a portable computer or notebook computer, the user telephony communication device 104 also preferably comprises a PC Card.

The portable computer system 102B may include an external telephone instrument which connects to the computer system 102B. Alternatively, or additionally, as shown, the portable computer system 102B preferably executes software which presents a "virtual telephone" on the video screen of the computer system 102B, as described above. In this embodiment, the portable computer 102B preferably includes an integrated speakerphone which provides transmitter/receiver capabilities.

As shown, each of the computers 102A and 102B are connected to the corporate office virtual presence server 106 via the public switched telephone network (PSTN). Each of the computers 102A and 102B are also connected to the corporate office PBX 112 via the PSTN.

In one embodiment, the user telephony communication device 104 includes an analog modem 184, preferably a V.34 modem, which is used where an ordinary analog telephone line is available to connect to the corporate office. In a second embodiment, the user telephony communication device 104 utilizes an integrated services digital network (ISDN) terminal adapter 182. The ISDN embodiment provides higher speed data transmissions and improved voice quality. Any of the various embodiments preferably also supports a local group three facsimile (fax) machine.

The PSTN connects to the corporate office virtual presence server 106 preferably via either ISDN terminal adapters 182 or analog V.34 modems 184, and the PSTN connects to the corporate PBX via PBX—Central Office phone lines, as is well known. As shown in FIG. 3, the virtual presence server 106 connects to the corporate PBX 112 via PBX lines. The corporate PBX 112 connects to various telephone instruments 122 in the corporate office, as is well known. The virtual presence server 106 connects to the corporate PBX 112 to extend PBX features to the remote user and also to support voice communication between the corporate office and the remote user.

The virtual presence server 106 also connects to the corporate local area network (LAN) 114. As shown, the corporate LAN 114 may comprise an Ethernet network 132, a Token Ring network, or other type of local area network, as desired. Various computer systems are connected to the LAN 114, as is well known.

In one embodiment, the computer systems 102A and 102B comprise DSVD (digital simultaneous voice and data) modems as well as the appropriate software for enabling simultaneous voice and data transmissions. In another embodiment, the computer systems 102A and 102B include a communications device, such as a modem, which utilizes a special protocol for multiplexing multiple data types on a single communications line, such as a telephone line, including voice, LAN data, fax data, and telephony control data. In the present disclosure, the term "telephony control data" includes PBX extension data as well as other telephony control information.

It is noted that a road warrior preferably has virtual phone and virtual fax software applications executing on his computer system. The telecommuter operating from his home may include a "real" fax machine as well as a "real" phone. Where a telecommuter's system includes a physical fax machine, and an ISDN connection is used, the analog facsimile data generated by the fax machine is preferably re-digitized in the remote computer system 102 and communicated over the PSTN to the virtual presence server 106. In this embodiment, each of the remote computer system 102 and the virtual presence server 106 include a fax/modem chip. When the remote user sends a fax using the "real" fax machine, the remote computer 102 receives the fax, converts the analog data to digital data, and transmits the digital data to the virtual presence server 106. The virtual presence server 106 uses its fax modem to perform digital to analog conversion and provides the analog fax data to a "real" or virtual fax machine at any location, such as the corporate office. Alternatively, the virtual presence server may forward the fax data to a fax server for transmission.

2. FIG. 4: Branch Office with Key System or PBX

Referring now to FIG. 4, a system according to the present invention is shown which enables users in a branch office to connect to a corporate office. In a branch office, the user telephony communication device 104 is preferably a rack mounted device, referred to as an BO Server 160, which includes multiple inputs and which handles multiple phone lines. As shown, the branch office preferably includes its own local area network (LAN) 154 for connecting multiple computer systems. The branch office also preferably includes a key system unit (KSU) 152 or small PBX which provides telephone connectivity for telephones in the branch office.

As shown, each of the computers 102 in the branch office are connected to the remote office LAN 154, and the LAN 154 in turn connects to the BO Server 160. The BO Server 160 connects to a corporate office BO virtual presence server 107 via the PSTN. The BO virtual presence server 107 is similar to the virtual presence server 106 described above. The BO Server 160 also connects to the corporate office PBX 112 via the public switched telephone network (PSTN).

Figure 6:
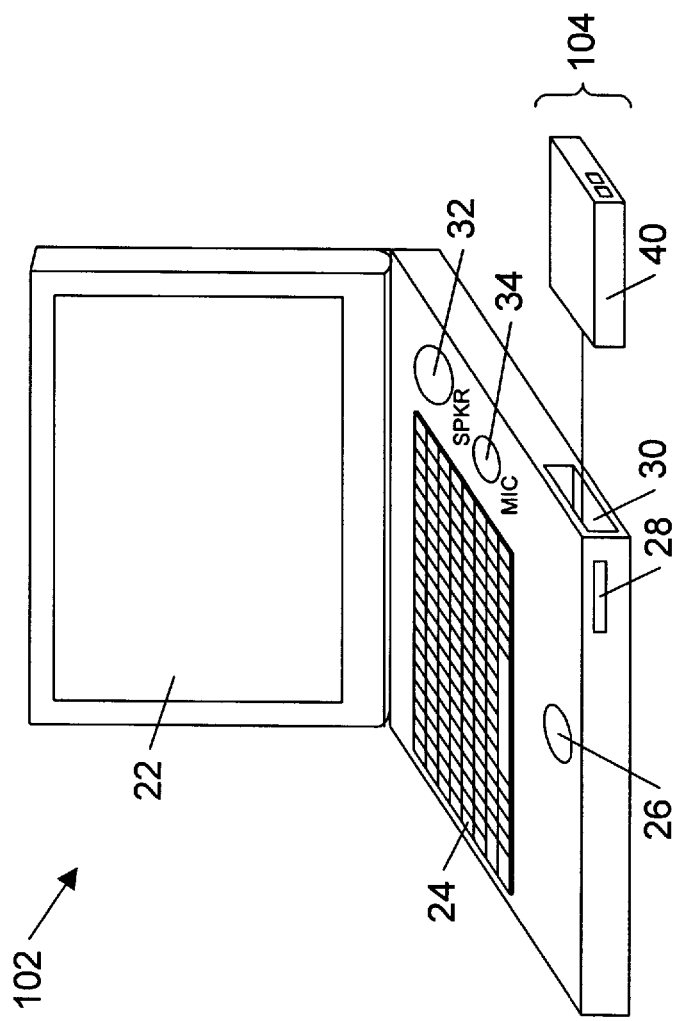
FIG. 6 illustrates the individual remote worker logic configured as a PC Card adapted for connecting to the remote computer system of FIG. 1.

The BO virtual presence server 107 in the corporate office which interfaces to the BO server 160 in a branch office is preferably different than the virtual presence server 106 which interfaces to telecommuters and road warriors. The BO virtual presence server 107 is preferably different due to the need of the BO virtual presence server 107 to interface to a small key system or small PBX in the remote office. In the embodiments of FIGS. 5 and 6, if telecommuters and road warriors desire to remotely connect to the corporate office, then the corporate office preferably includes a separate virtual presence server 106 dedicated to the telecommuters and road warriors. Thus in the preferred embodiment the functionality between the two different types of virtual presence servers 106 and 107 is not mixed. In an alternate embodiment, the corporate office includes a single virtual presence server 106 which serves both a branch office as well as telecommuters and road warriors.

The computers 102 and telephones 124 in the remote office are connected to the corporate office through the BO Server 160 and the PSTN. The BO Server 160 connects to the PSTN using either ISDN service, DDS (digital data service), leased lines, such as T1 lines, or other communications devices or media. The BO Server 160 may also connect to the corporate office virtual presence server 107 using a plurality of analog modems, as desired. The PSTN connects to the corporate office virtual presence server 107 via communications media such as ISDN, DDS, T1 lines, or analog V.34 modems, and the PSTN connects to the corporate PBX via PBX—Central Office phone lines, as is well known.

As discussed above with reference to FIG. 3, in FIG. 4 the BO virtual presence server 107 in the corporate office connects to the corporate PBX 112 via PBX lines. The corporate PBX 112 connects to various telephone instruments 122 in the corporate office, as is well known. The BO virtual presence server 107 also connects to the corporate local area network (LAN) 114. As shown, the corporate LAN 114 may comprise an Ethernet network 132, a Token Ring network, or other local area network, as desired. Various computer systems 134 are connected to the LAN 114, as is well known.

In a branch office application, the BO server 160 supports telephone connectivity, also referred to as Central Office (C.O.) appearances, wherein a user in the remote office is not required to "back-call" telephone calls to other users in the remote office. In other words, for a user in the remote office to call a user next door in the remote office, the user is not required to call the corporate office and then have the virtual presence server 107 in the corporate office call back to the next door user in the remote office.

In one embodiment of FIG. 4, the computer systems 102 and/or the BO server 160 further comprise DSVD (digital simultaneous voice and data) modems as well as the appropriate software for enabling simultaneous voice and data transmissions. As discussed further below, one embodiment includes communications devices such as modems which utilize a special protocol for multiplexing multiple data types on a single communications line, including two or more of voice, LAN data, fax data, and telephony control data.

It is noted that the key system unit 152 does not provide the user with complete virtual presence because the user is noticeably in a remote office where he is required to select an outside line. Thus the user does not enter the same sequence of button entries that the user would enter if the user were physically in the corporate office. A key system unit also places a different protocol between the user and the telephone, depending on whether the user is calling someone in the remote office or in the corporate office. Thus a branch office which uses KSU 152 does not have the same level of telepresence as a branch office including a BO Server 160 embodying an internal PBX function. This is because the KSU 152 is located between the remote users and the BO server 160.

In one embodiment, the BO server 160 displaces a key system unit at the branch office. In other words, the BO server 106 executes software which provides at least a subset of the functionality of a key system or PBX, and this "soft" key system or PBX is operated over the remote office LAN 154. The BO Server 160 is thus programmed to behave as a PBX, wherein the BO Server 160 offers a local intercom between the stations.

Thus, in a remote office with 10 people and having an BO server 160, one remote office worker can talk to someone in the next office using a local extension in the remote office or place a local call in the BO area code. The BO server 160 also provides the same user interface to each remote worker as if the respective remote worker were physically located in the corporate office.

The BO Server 160 also may act as a file server or application server in the remote office LAN 154, as desired. Alternatively, the BO Server 160 acts as an additional server on the remote office LAN 154 if a server already exists.

3. FIG. 5: Branch Office

Referring now to FIG. 5, a system according to another embodiment of the present invention is shown which enables users in a branch office to connect to a corporate office. FIG. 5 illustrates a corporate office virtual presence server 107A interfacing to two branch offices. The system shown in FIG. 5 is similar to the system shown in FIG. 4, except that the branch offices in FIG. 5 does not include a key system or PBX, but rather includes standard telephone instruments (POTS) or a Centrex telephone system. This configuration in the remote office implies that voice data is transferred over the BO LAN 154. Thus a local extension call is multiplexed on the LAN 154, and the BO server 160 provides local switching.

As discussed above, in a branch office the user telephony communication device 104 is preferably a rack mounted device referred to as the BO Server 160A, which includes multiple inputs and which handles multiple phone lines. Each of the branch offices shown in FIG. 5 includes a LAN 154 for connecting multiple computer systems. Each branch office also preferably includes a BO server 160A corresponding to the LAN 154. The BO server 160A provides telephone connectivity for telephones 124 in the branch office.

As shown, each of the computers 102 in the branch office are connected to the respective remote office LAN 154, and each LAN 154 in turn connects to a respective BO Server 160A. Each BO Server 160A connects to the corporate office virtual presence server (virtual presence server) 107A, and to the corporate office PBX 112, via the public switched telephone network (PSTN). The computers 102 in the remote office connect through a respective BO Server 160A, and the BO Server 160A connects to the PSTN using a communications device and/or media such as analog modems/phone lines, ISDN service, DDS (digital data service) or leased lines, such as T1 lines, among others. The PSTN connects to the corporate office virtual presence server 107A via one or more communications devices and/or media such as ISDN, DDS, T1 lines, or analog V.34 modems, and the PSTN connects to the corporate PBX via PBX—Central Office phone lines, as is well known.

As discussed above with reference to FIG. 3, in FIG. 5 the virtual presence server 107A at the corporate office connects to the corporate PBX 112 via PBX lines. The corporate PBX 112 connects to various telephone instruments 122 in the corporate office, as is well known. The virtual presence server 107A also connects to the corporate local area network (LAN) 114. As shown, the corporate LAN 114 may comprise an Ethernet network 132, a Token Ring network, or other local area network, as desired. Various computer systems 134 are connected to the LAN 114, as is well known.

As discussed above, the virtual presence server 107A which interfaces to users in a branch office is preferably different than the virtual presence server (FIG. 3) 106 which interfaces to telecommuters and road warriors due to the need of the virtual presence server 107A to interface to the BO Server in the remote office via multiple communication paths. In the embodiment of FIG. 5, if telecommuters and road warriors desire to remotely connect to the corporate office, then the corporate office preferably includes a separate virtual presence server 106A dedicated to the telecommuters and road warriors, as discussed above. Alternatively, the virtual presence server 106A includes functionality for one or more branch offices, telecommuters, and road warriors.

In a branch office application, the BO server 160A supports telephone connectivity, wherein a user in the remote office is not required to "back-call" telephone calls to other users in the remote office. In other words, for a user in the remote office to call a user next door in the remote office, the user is not required to call the corporate office and then have the virtual presence server in the corporate office call back to the next door user in the remote office.

In one embodiment of FIG. 5, the computer systems 102 further comprise DSVD (digital simultaneous voice and data) modems as well as the appropriate software for enabling simultaneous voice and data transmissions. As discussed further below, one embodiment preferably utilizes a novel protocol for multiplexing multiple data types on a single communications line, including two or more of voice, LAN data, fax data, and telephony control data.

FIG. 6—User Telephony Communication Device

Referring now to FIG. 6, a diagram illustrating the user telephony communication device 104 (FIG. 2), shown here implemented as PC Card 40, according to the one embodiment of the present invention used with portable computer system 102 is shown. As shown, the portable computer system 102 includes a video screen 22, a keyboard 24, mouse 26, and a floppy drive 28. The computer system 102 also preferably includes a microphone 34 and speaker 32. The computer system 102 further includes at least one PCMCIA slot 30 for receiving a PC Card.

In this embodiment the user telephony communication device 104 is preferably configured as a PCMCIA (Personal Computer Memory Card International Association) PC Card 40 adapted for insertion into the PCMCIA slot 30 of the computer system 102. This allows the user telephony communication device 104 to be easily used with portable and laptop computer systems. However, it is noted that, for desktop or tower systems, i.e., nonportables, the user telephony communication device 104 may also be configured as an expansion card for insertion into an expansion bus of the computer system. The user telephony communication device 104 may also be configured directly on the motherboard of the computer system 102. The user telephony communication device 104 may have other physical configurations, as desired.

As mentioned above, the user telephony communication device 104 may be adapted for communicating through various communication mechanisms. For example, in one embodiment, the user telephony communication device 104 is an analog unit including a modem for interfacing to an analog phone line. In another embodiment, the user telephony communication device 104 includes an ISDN terminal adapter unit for interfacing to an ISDN line. The user telephony communication device 104 may also be configured for other types of communication mechanisms, such as ATM, and T1 lines, among others.

Figure 7:
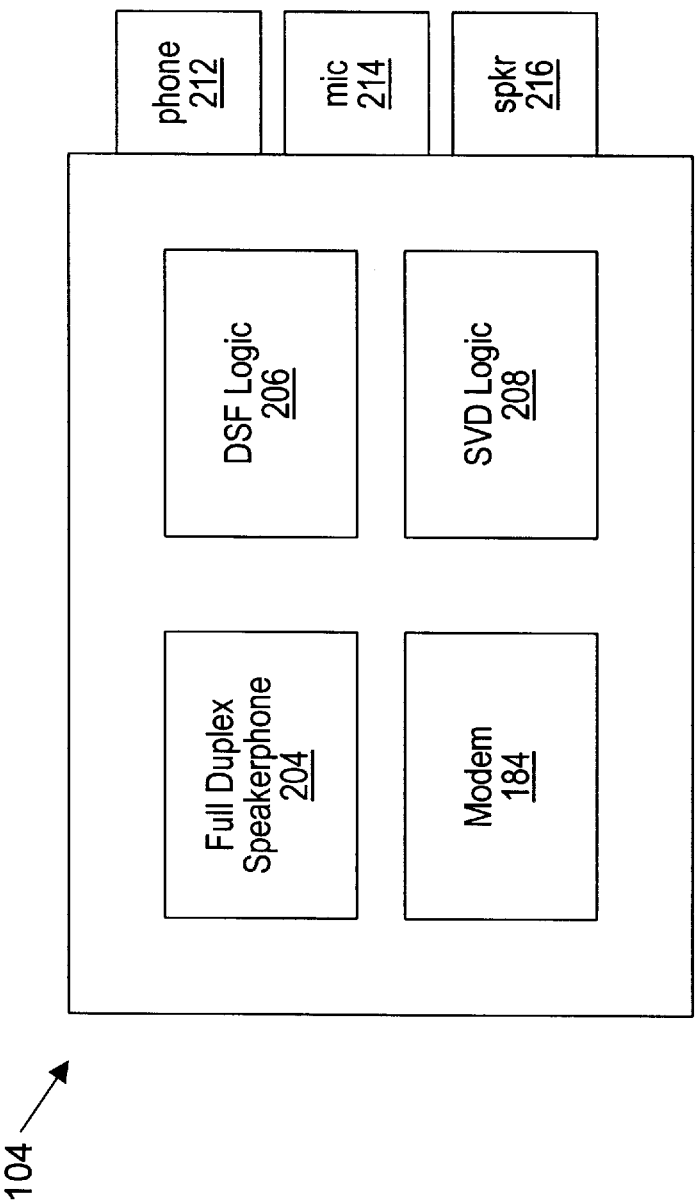
FIGS. 7 and 8 are block diagrams illustrating embodiments of the individual remote worker unit of FIG. 1.

FIG. 7 is a block diagram of one embodiment of the user telephony communication device 104 including an analog modem 184. As shown, the user telephony communication device 104 preferably comprises a V.34 modem 184 and also includes a full-duplex speakerphone 204. The analog user telephony communication device 104 also preferably includes simultaneous voice and data (SVD) logic 208 for performing SVD capabilities. The SVD logic 208 operates with the modem 184 and with the full-duplex speakerphone 204. The SVD logic preferably multiplexes a plurality of data types in a single communication channel, such as voice, LAN data, fax data, and telephony control data.

The analog user telephony communication device 104 also preferably includes digital simultaneous facsimile (DSF) logic for performing DSF capabilities. The user telephony communication device 104 preferably includes a phone jack 212 for connecting to an analog phone line, or telco line. The user telephony communication device 104 also preferably includes external jacks 214 and 216 for an external microphone and speaker, respectively, one or more jacks for pass through of microphone and speaker to a computer sound system (not shown), and a jack for an external phone (not shown).

Figure 8:
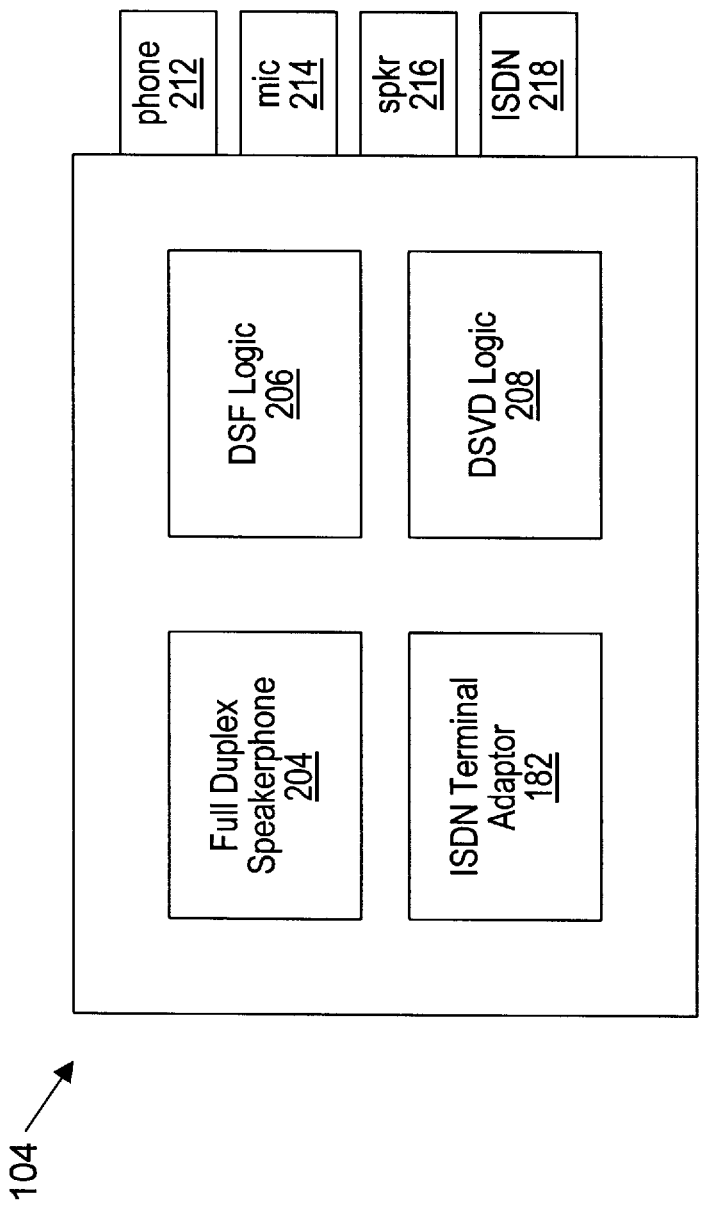

FIG. 8 illustrates an ISDN embodiment of the user telephony communication device 104, wherein the user telephony communication device 104 is adapted for ISDN capability. In this embodiment, the user telephony communication device 104 comprises an card ISDN terminal adapter (TA) 182 adapted for coupling to an ISDN line, i.e., which generates one or more 64 Kbps ISDN B channels. The ISDN terminal adapter 182 preferably includes logic for digitally encoding the voice signal, for example, performing 32 kilobyte analog to digital pulse code modulation (ADPCM). The ISDN user telephony communication device 104 preferably includes a full-duplex speakerphone 204, as well as digital simultaneous voice and data (DSVD) logic 209 for performing DSVD capabilities. The DSVD logic 209 preferably provides or multiplexes a plurality of data types on one or more ISDN B channels, including voice data, LAN data, fax data and telephony control data.

The ISDN user telephony communication device 104 also preferably includes digital simultaneous facsimile (DSF) logic 206 for performing DSF capabilities. The ISDN user telephony communication device 104 also preferably includes an external jack 218 for connecting to an ISDN line, one or more jacks 214 and 216 for an external microphone and speaker, respectively, one or more jacks for pass through of a microphone and speakers, such as to the computer sound system (not shown), and a jack 212 for connecting to an analog phone line.

It is noted that the user telephony communication devices 104 shown in FIGS. 7 and 8 are designed for telecommuters and road warriors. A BO server 160 used for a branch office is preferably similar to either the embodiments of FIGS. 10 and 11, but includes additional functionality for providing LAN access at the branch office and also providing local PBX extensions between the plurality of workers at the branch office, as discussed above, as well as additional inputs and outputs and communication devices.

Figure 9:
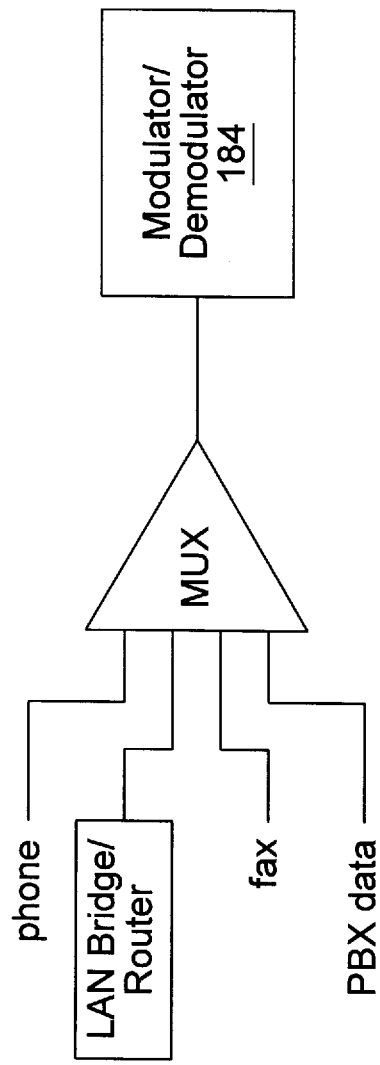
FIG. 9 illustrates a conceptual block diagram of the operation of the modem of FIG. 7.

FIG. 9 is a conceptual diagram illustrating the operation of the modem 184 of FIG. 7. As shown, the modem 184 is adapted for transmitting and/or receiving data having various different data types. For example, one or more of analog phone signals (voice), LAN data, fax data, telephony control data, and other data is provided through a multiplexer to the modem 184. The modem preferably transmits the multiple data types over a single communication media, such as a telephone line. The modem 184 preferably statistically time division multiplexes the data on the phone line in individual packets for each data type. Thus the modem 184 creates a plurality of virtual channels on the single physical channel. The modem 184 also receives data of different data types from a phone line and intelligently distributes the data within the computer system.

Figure 10:
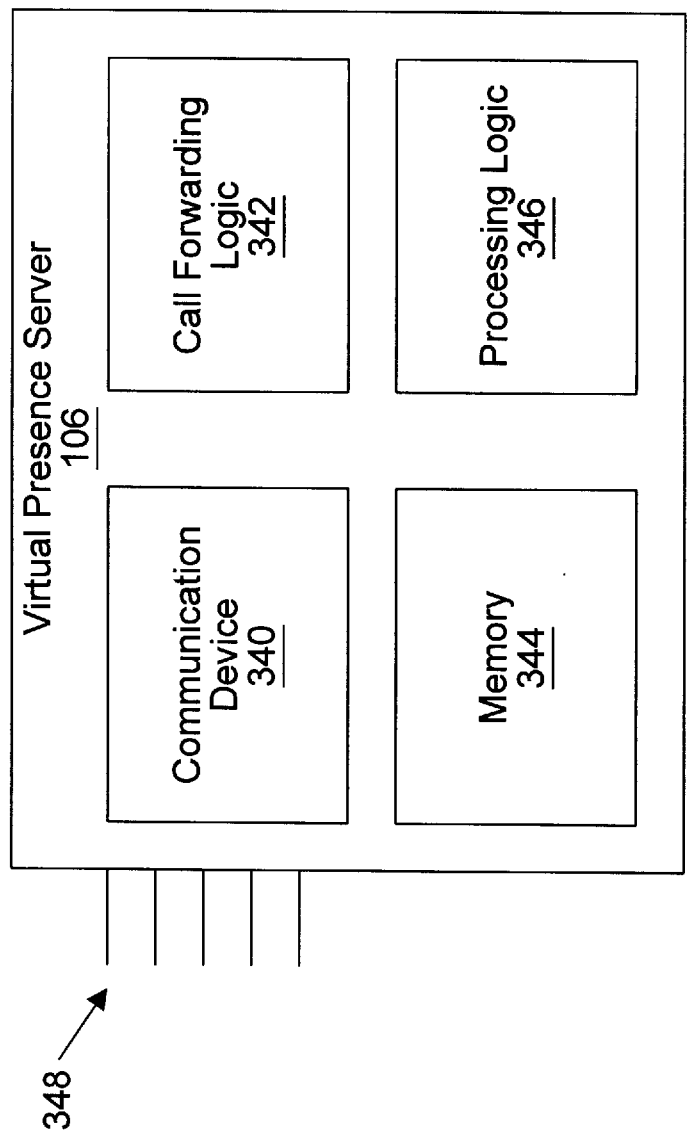
FIG. 10 is a block diagram of the virtual presence server of the preferred embodiment.

FIG. 10—Virtual Presence Server

The virtual presence server 106 preferably comprises a computer system which connects to the LAN 114 and which also connects to the corporate office PBX 112. The virtual presence server 106 preferably comprises a high performance computer system executing the Windows NT operating system. In other words, the virtual presence server 106 is preferably a Windows NT server. The virtual presence server 106 may also comprise a UNIX server or may execute other operating systems, as desired. The virtual presence server 106 preferably includes a plurality of communications interfaces, as shown in FIG. 2. In one embodiment, the virtual presence server 106 includes a plurality of modems 184 which correspond to a plurality of phone lines. The virtual presence server 106 also preferably includes one or more ISDN terminal adapters 182 which connect to a corresponding one or more phone lines.

The virtual presence server system 106 provides a remote user with a virtual presence to a data site or corporate office, wherein the data site or corporate office includes a first telephone number associated with the remote user which is used to access the remote user at the data site. The virtual presence server system comprises a plurality of inputs 348 for coupling to a transmission media. One or more of the plurality of inputs 348 receive communications from a user telephony communications device 104 operated by the remote user, wherein the user telephony communications device 104 is physically located remotely from the virtual presence server system 106.

The virtual presence server 106 includes a memory 344 for storing identification information received from the user telephony communications device 104. The virtual presence server 106 also includes a communication device 340 coupled to the memory 344 for providing voice and data information to the user telephony communications device 104. The virtual presence server 106 further includes processing logic 346 for accessing and verifying identification information received from the user telephony communications device 104, as well as other operations. The virtual presence server 106 further includes call forwarding logic 342 for performing remote call forwarding and/or remote access call forwarding operations using the identification information.

As discussed below, the virtual presence server 106 is operable to perform a remote call forwarding operation to forward telephone calls made to the first telephone number which are intended for the user at the data site. The remote access call forwarding operation directs the telephone calls made to the first telephone number to be forwarded to the virtual presence server 106. The virtual presence server 106 is operable to route the telephone calls to the first telephone number and forwarded to the virtual presence server 106 to the user telephony communications device 104. In other words, the user telephony communications device 104 includes a second telephone number which is usable to access the user telephony communications device 104, and the virtual presence server 106 is operable to forward or route telephone calls made to the first telephone number to the second telephone number.

In addition, where a second telephone number is used to access the user telephony communications device 104, the virtual presence server is operable to perform a remote access call forwarding operation to forward telephone calls made to the second telephone number which are intended for the user telephony communications device 104. The remote access call forwarding operation directs the telephone calls to the second telephone number to be forwarded to the first number at the data site and/or to the virtual presence server. The virtual presence server 106 is thus operable to receive telephone calls made to the second number and forwarded to the data site, and the virtual presence server 106 is operable to route the telephone calls made to the second telephone number and forwarded to the virtual presence server 106 to the user telephony communications device 104.

As shown in FIG. 2, and as discussed above, the system of the present invention in one embodiment includes a remote access server in addition to the virtual presence server 106. Alternatively, the system includes a bridge router in addition to the virtual presence server 106. In another embodiment, the system includes the remote access server and a bridge router in addition to the virtual presence server 106, depending on the capabilities of the user telephony communication devices 104 which contact the virtual presence server 106. In yet another embodiment, the virtual presence server 106 implements the remote access functionality. In one embodiment, the virtual presence server 106 is a SCSA (Signal Computing System Architecture) or MVIP call server in addition to acting as a virtual presence server.

Data Transfer Protocol

Figure 11A:
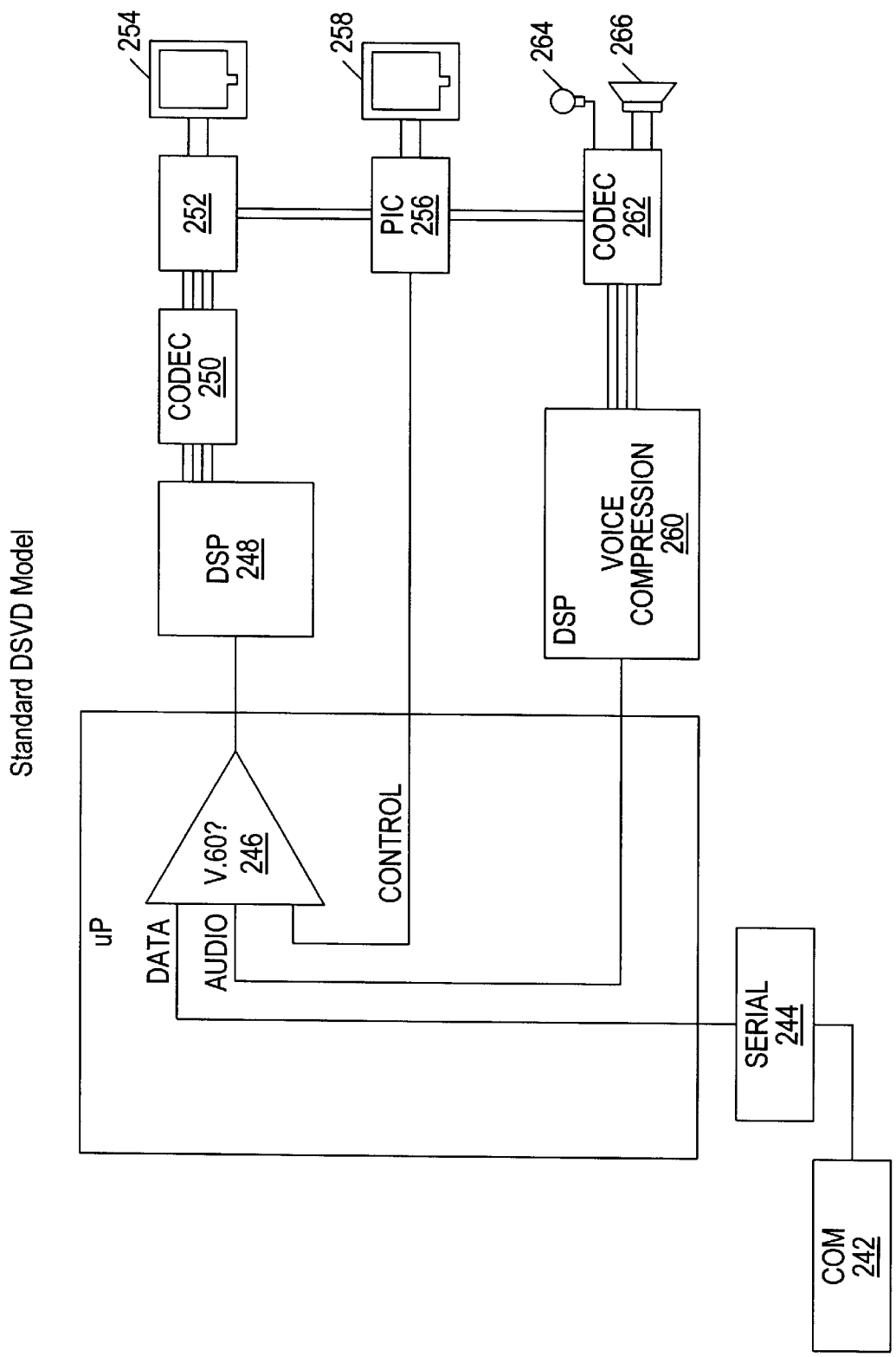
FIG. 11A illustrates a standard DSVD hardware model according to the prior art.

FIG. 11A illustrates a standard DSVD hardware model according to the prior art. As shown, the standard DSVD hardware model comprises a CPU executing software which performs a modem protocol, such as the V.42 protocol or the V.60 protocol. The CPU executing software is represented as a box which includes a V.60 block 246. The computer system includes a COM port 242 which provides data through a serializer 244 to the V.60 block 246. The CPU executing the V.60 protocol, i.e., the V.60 block 246, receives data from and provides data to the serial COM port 242. The computer system includes a microphone 264 and speakers 266 which provide analog audio data through a codec 262 to voice compression logic 260. The voice compression logic 260 provides compressed audio output to the V.60 block 246.

The DSVD modem includes a first phone jack 254 for connecting to an external communication mechanism, i.e., a phone line, and a second phone jack 258 for connecting to a telephone instrument. The second phone jack 258 connects to a phone interface controller (PIC) 256 which provides control data to the V.60 block 246. The V.60 block couples to a DSP 248 and then to a codec 250. The codec 250 and the PIC 256 connect to block 252 which then connects to phone jack 254. The phone jack 254 provides analog data output to an analog phone line and receives analog data from the phone line.

When the DSVD modem receives data from the phone line, the data is received by the phone jack 254 and is provided through the codec 250, the DSP 248, the V.60 block 246 and the serializer 244 to the COM port 242. The data received by the phone jack 254 is also provided through the PIC 256 to the telephone instrument 258. Data is also provided from either the COM port 242 or the telephone instrument jack 258 to the external phone jack 254 in an opposite manner.

Simultaneous voice and data (SVD) modems differ from standard modems in that they require multiple channels created between the two connected modems. SVD modems require a first channel to carry data and a second channel to carry voice. In one embodiment of the present invention, as discussed below, the modems comprised in the user telephony communication device 104 and in the virtual presence server 106 include first and second channels for data and voice, and a third channel between the modems for extending PBX interfaces.

Modem Architecture—Present Invention

Figure 11B:
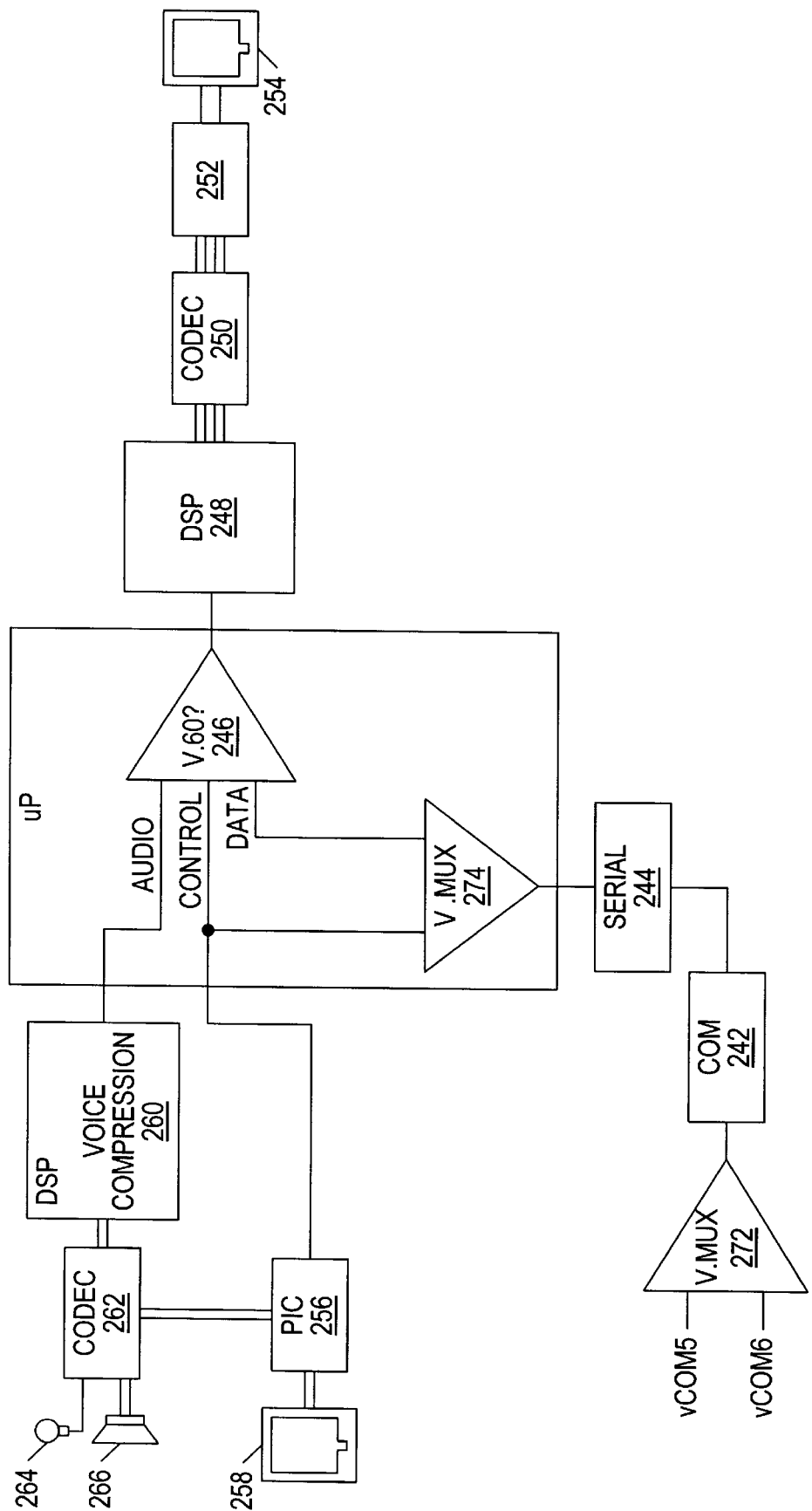
FIG. 11B illustrates a modem architecture according to the present invention.

FIG. 11B illustrates an architecture for the modem comprised in the user telephony communication device 104 according to one embodiment of the present invention. Elements which are preferably identical to elements discussed above with reference to FIG. 10 have the same reference numerals for convenience. It is noted that the user telephony communication device 104 in the remote computer system 102 may comprise various types of communication devices, including modems and ISDN terminal adapters. The description below presumes that an analog modem is comprised in the user telephony communication device 104.

The present invention preferably maintains multiple virtual COM ports which interface to one or more real or physical COM ports. As shown, the present invention includes a CPU executing software which performs the V.60 protocol. The CPU also executes software which performs a virtual COM port multiplexing (V.MUX) function. The CPU executing software is represented as a box which includes a V.60 block 246 and a V.MUX block 274.

As shown the computer system implements multiple virtual COM ports which are provided to a single physical COM port 242. The COM port 242 connects to a serializer 244 which connects to a virtual COM port multiplexer 274 referred to as V.MUX. The V.MUX block 274 connects through a data path to the V.60 logic. The V.MUX block 274 also connects through a control path to the V.60 block and a phone interface controller 256. The CPU executing the V.60 protocol, i.e., the V.60 block 246, receives data from and provides data to the serial COM port 242.

The computer system includes a microphone 264 and speakers 266 which provide analog audio data through a codec 262 to voice compression logic 260. The voice compression logic 260 provides compressed audio output to the V.60 block 246. The codec 262 also connects to the PIC 256, which connects to a telephone instrument phone jack 258.

The modem includes a first phone jack 254 for connecting to an external communication mechanism, i.e., a phone line, and a second phone jack 258 for connecting to a telephone instrument. The second phone jack 258 connects to the phone interface controller (PIC) 256 which provides control data to the V.60 block 246. The V.60 block 246 couples to a DSP 248 and then to a codec 250. The codec 250 connects to block 252 which then connects to phone jack 254. The phone jack 254 receives and provides analog data output to an analog phone line. Thus, the V.60 block 246 receives data from a serial COM port 242 as well as control data from the PIC 256 and audio data from the voice compression logic.

When the modem receives data from the phone line, the data is received by the phone jack 254 and is provided through the codec 250, the DSP 248, the V.60 block 246 and the serializer 244 to the COM port 242. The data received by the phone jack 254 is also provided through the PIC 256 to the telephone instrument through the jack 258. Data is also provided from either the COM port 242 or the telephone instrument jack 258 to the external phone jack 254. When data is provided from the phone jack 254 to the COM port 242, the CPU multiplexes this data with other data streams which may be provided to the COM port 242, as represented by the V.MUX block 274. Thus the computer system creates multiple virtual COM ports or channels in software which share the single physical COM port. Likewise, when data is provided from the COM port 242 to the phone jack 254, the V.MUX block 272 multiplexes this data with other data streams from multiple virtual com ports.

The present invention preferably includes a plurality of protocols, i.e., two or more protocols, which connect the virtual presence server 106 and the remote computer system 102. The preferred embodiment preferably creates three channels between the virtual presence server 106 and the remote computer system 102 to allow data and voice transmissions, as well as the transfer of telephony control data, i.e., PBX extension data. Thus the third channel is reserved for telephony control data between the virtual presence server 106 and the remote computer system 102.

DSVD is currently defined to support a protocol that simultaneously carries voice and carries data at the same time. G.dsvd defines two channels of voice and data. A standard referred to as T-120 includes a virtually unlimited number of self creating logical channels and a standard referred to as H-124 includes 20 or more channels. Thus the preferred embodiment uses the T-120 standard to allow three or more channels between the virtual presence server and the remote computer system. In an alternate embodiment, the data channel runs a network protocol such as NETBEUI, IPX, or TCP/IP, which provides a plurality of logical channels, one of which serves as the telephony control channel Therefore, the present invention creates multiple logical channels between two modems over a single analog line, preferably using time multiplexing techniques. The present invention also creates multiple channels between the modem and the PC itself using multiple virtual COM ports which interface to a single physical COM port.

Thus, multiple channels are created between the remote computer system and the virtual presence server. In one embodiment, the method creates multiple COM port addresses and COM drivers. Currently, when a software application uses or takes control of a modem, the modem is not available for other software applications. Thus the present invention creates a plurality of virtual COM ports. This allows software applications to use virtual COM ports and thus effectively share a single physical COM port.

When a software application makes a call which requests a modem, virtual com port software executing on the remote computer system 102 determines if the software application should be granted access to a virtual COM port of the modem. It is noted that the COM port is not required to be a real COM port. These plurality of virtual COM ports preferably each reference a channel in the communication line. If access is allowed, then the application is allowed a channel on the communication mechanism. The V.MUX block 272 multiplexes these data accesses to the physical COM port 272.

Under Windows, Windows NT, UNIX, and other modem operating systems, the present invention creates multiple virtual software COM ports with no hardware implications. In an alternate embodiment, the computer system includes multiple physical hardware COM ports.

The protocol of the present invention operates to extend the PBX features to the remote users, as well as manage the PBX features used by the remote users. The present invention also combines voice and data transmissions. The combined voice and data transmissions are preferably very compressed. Alternatively, the combined voice and data transmissions are "spoofed" to remove extraneous or unneeded data traffic, i.e., maintenance and handshaking traffic.

Modem Architecture—Virtual Presence Server

The modem architecture of a modem in the virtual presence server 106 according to the present invention is preferably similar to conventional modems and may include digital simultaneous voice and data (DSVD) or digital simultaneous voice, data and fax capabilities, as desired.

User Telephony Communication Device—Software

The remote computer system or communication device 102 includes software which interfaces to the user telephony communication device 104 in the remote computer system 102 which allows remote access and virtual presence to the corporate office according to the present invention. The virtual presence software of the present invention preferably resides on the hard disk drive of the computer system 102 and is loaded into system memory during use. The virtual presence software preferably executes in the background of other applications as one or more device drivers, i.e. one or more network drivers. For example, the virtual presence software may comprise a suite of drivers, including a virtual presence protocol driver and a virtual phone application.

The remote computer system 102 preferably uses a virtual network protocol (VNP) to perform a plurality of activities simultaneously. Thus, the remote computer system 102 can automatically connect to the corporate office on an as needed basis.

The user telephony communication device 104 in the remote computer system includes transparent access capabilities to the corporate office LAN 114 as a remote LAN node (RLN). The remote computer system 102 preferably includes NDIS and/or ODI drivers for Microsoft and Novel local area networks.

The remote computer system 102 also preferably includes transparent access capability to the corporate office telephone system or PBX 112 as an extension telephone set. As mentioned above, the computer system 102 preferably includes an external telephone instrument which connects through the computer system to the user telephony communication device 104. Alternatively, or additionally, software executing on the remote computer system implements a virtual phone on the computer screen, as desired. The external telephone set is preferably used in situations where privacy is desired.

The user telephony communication device 104 according to the present invention also provides the remote user with transparent access capability to the corporate office telephone system for faxing capabilities. Thus, data is transferred from the remote computer system to the corporate office telephone system and a fax protocol is applied to the data when the data is received at the corporate office, i.e. the data is locally modulated and demodulated depending upon the direction of the facsimile transmission.

Figure 12:
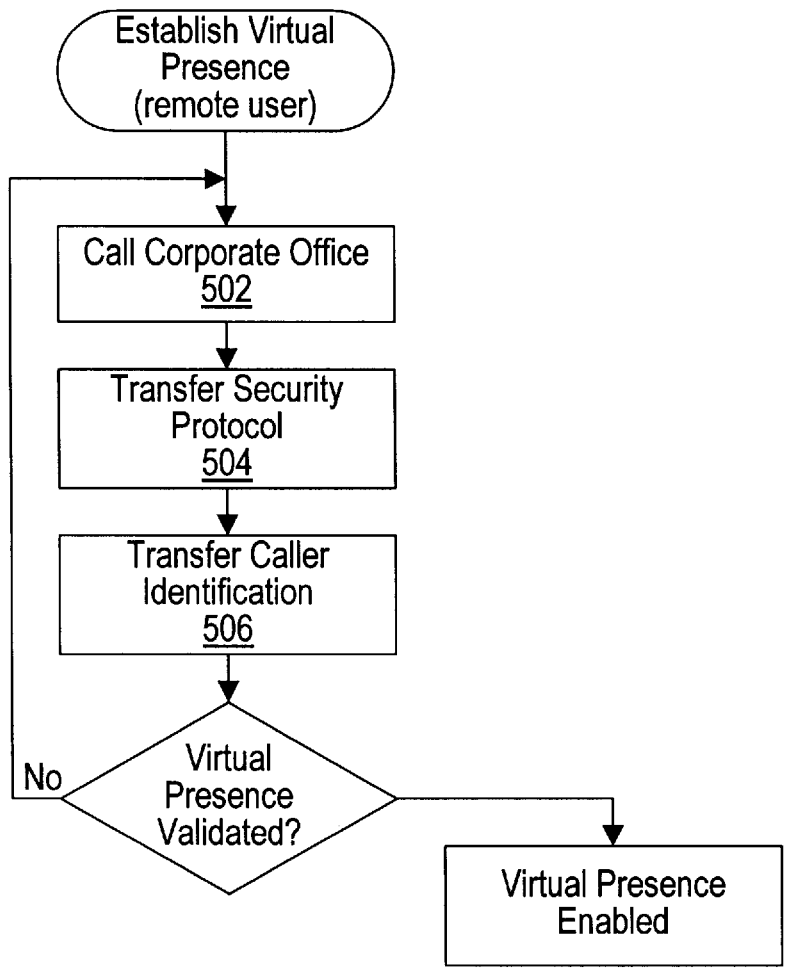
FIG. 12 is a flowchart diagram illustrating operation of the individual remote worker unit of the present invention.

FIG. 12—User Telephony Communication Device Operation

Referring now to FIG. 12, a flowchart diagram illustrating operation of the virtual presence software executing on the remote computer system according to the present invention is shown. In step 502, in response to user input, the remote computer system establishes a connection to the host system, i.e., to the virtual presence server at the corporate office. In the preferred embodiment, the virtual presence software presents a graphical user interface (GUI) on the screen, including an icon titled "Be There."

The user preferably clicks the mouse on the "Be There" icon to establish a connection between the remote computer system and the corporate office. Clicking the mouse button on the "Be There" icon invokes an autodial routine, and the autodial routine operates to provide a connection between the remote computer system and the corporate office. Alternatively, the user can initiate the autodial program routine from the operating system command line by typing in a respective command. This may be done in GUI-based operating systems, or in non-GUI operating systems, such as DOS.

It is noted that various telephone service set-up sequences may be performed before autodialing the virtual presence server 106, such as canceling call waiting. Also, the user telephony communication device or the virtual presence server 106 may instruct the telephone company Central Office to automatically route all calls made to the remote user's home number to the corporate office. Thus external parties who call the telecommuter's home phone number, i.e., personal calls, are routed to the corporate office, through the virtual presence server, and to the telecommuter at his home. The external party calling the telecommuter at his home will not be aware that the call was routed in this fashion.

In another embodiment, designed for telecommuters, when the user enters his office at his home or house and turns on his computer, the computer automatically executes a routine which connects to the virtual presence server 106 at the corporate office.

The entire telephone number used by the virtual presence software to call the host is preferably stored in memory and then automatically dialed. According to the preferred embodiment of the invention, the virtual presence software also provides the option for the user to manually enter, a telephone number to establish a connection to the corporate office. This is necessary due to the various prefixes that may be required to obtain an outside telephone line from hotels and airports, etc. This option of allowing the user to manually enter the telephone number also provides the user with the ability to access alternative long distance carriers using calling cards. The virtual presence software also provides temporary storage of the manually entered number for repeat use.

After the telephone number has been dialed and the remote computer system makes contact with the host system or virtual presence server 106 at the corporate office, in step 504 the remote computer system 102 transfers security information according to a security protocol to the virtual presence server 106 at the corporate office. Thus, identification is preferably exchanged for security. In the preferred embodiment, the user manually enters a password which is received and analyzed by the host system virtual presence server 106.

The system of the present invention performs telephony functions through computer system 102 to access the corporate office, and thus the computer system 102 can perform various modem authentication techniques. For example, the remote computer system 102 may utilize a unique code hard-wired into the communications device, e.g., modem, encryption of unique random numbers, and the use of credit cards with passwords which periodically change. Thus the present invention facilitates more secure voice telephony authentication than prior voice systems. In other words, the present invention provides more secure computer-based authentication for voice, telepresence, virtual presence, and remote access call forwarding (RACF) applications.

After security negotiations have taken place in step 504, in step 506 the virtual presence software informs the virtual presence server 106 of the telephone number where the remote computer 102 is connected. The remote unit preferably utilizes caller ID information or uses other means to provide the telephone number where the remote computer is located. This telephone number can be used by the virtual presence server 106 to place a call to the current location where the remote computer 102 is physically located. This telephone number information received by the host virtual presence server 106 is stored by the virtual presence server 106 for the duration of the session.

After the proper security information and identity information have been transferred, in step 508 the remote computer system 102 receives a signal from the virtual presence server 106 indicating if the request for virtual presence has been accepted. If so, then in step 510 virtual presence is enabled. If not, i.e, if the wrong security information or caller information was transferred, then operation returns to step 502.

Once virtual presence has been enabled, the corporate PBX 112 preferably transmits telephony control data to the phone connected to the remote computer system 102 (or the virtual phone), including message indications, line indications, and LCD display information, etc. Thus the phone connected to the remote computer system 102 appears as an extension of the corporate PBX 112, just as if the phone were physically present at the corporate office.

Figure 13:
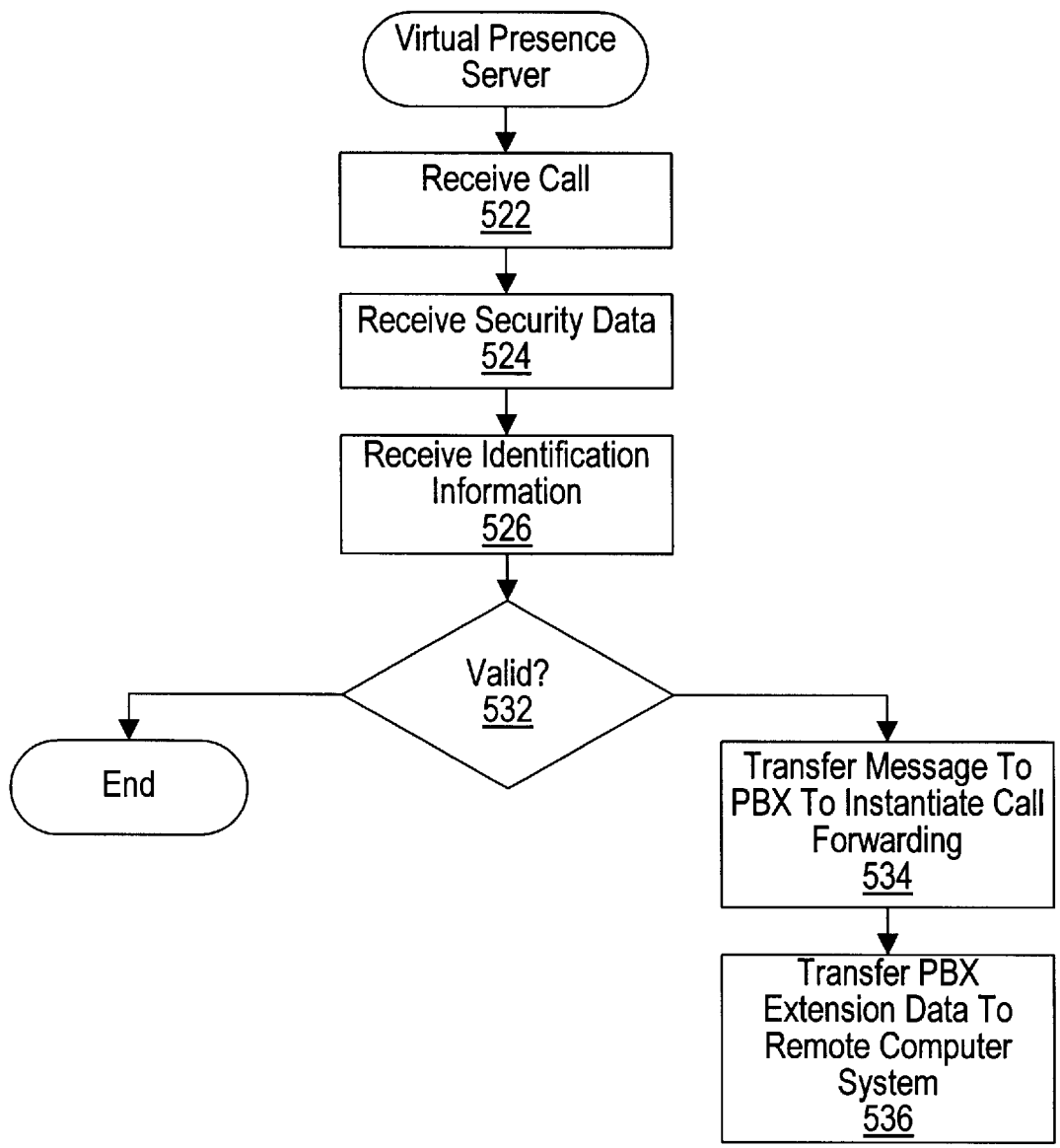
FIG. 13 is a flowchart diagram illustrating operation of the virtual presence server of the present invention.

FIG. 13—Virtual Presence Server Operation

Referring now to FIG. 13, a flowchart diagram illustrating operation of the virtual presence software executing on the virtual presence server 106 according to the present invention is shown. It is noted that the steps in FIG. 13 may occur in various orders, as desired.

In step 522 the virtual presence server 106 receives a call from the remote computer system 102, wherein the call is made by the remote computer system in step 502 of FIG. 12. In step 524 the virtual presence server 106 receives security information from the remote computer system 102, wherein the security information is transferred by the remote computer system 102 in step 504 of FIG. 12.

In step 526 the virtual presence server 106 receives identification information from the remote computer system 102 which indicates how the remote computer system 102 can be accessed. In the preferred embodiment, the virtual presence server 106 receives caller ID information from the PSTN indicating the source telephone number. It is noted that this step of receiving caller ID information actually occurs in step 522 when the call is received. Alternatively, step 526 involves receiving other types of identification information in addition to, or instead of, caller ID information.

In response to receiving the call and the security information, in step 532 the virtual presence server 106 determines if the call is valid, i.e., if the security data or password is valid and the caller identification is valid. This step of validating the caller ID information preferably involves determining if the source of the call matches a database of valid callers. This embodiment is preferably used for telecommuters and workers in a branch office where the source of telephone calls to the virtual presence server 106 in the corporate office is predictable and thus can be regulated.

If the security data or password is not valid, or the caller identification information is not valid, then the virtual presence server 106 refuses access to the caller. The virtual presence server 106 also preferably logs the identity of the caller using caller ID information, and operation returns to step 522. In one embodiment, step 526 occurs after step 532 and only the security data or password is used to validate callers.

After validation in step 532, in step 534 the virtual presence server 106 transfers a message to the corporate PBX 112 to instantiate remote call forwarding. The virtual presence server 106 issues a command to the PBX 112 regarding the virtual presence of the remote user. It is noted that this command to the PBX 112 may be issued automatically or manually. The command includes the instruction to forward all telephone calls made or destined to the extension of the remote user at the corporate office to the virtual presence server 106. When the virtual presence server 106 receives calls forwarded from the user's corporate office extension, the virtual presence server 106 operates to route these calls to the location of the remote user at his "virtual office." Thus external parties who call the user at the office are automatically routed to the user's remote location, thus providing the "virtual presence".

If the PBX 112 supports remote call forwarding, the virtual presence server 106 issues a sequence of tones, and hookflash if needed, on the line to the PBX 112 that direct the PBX 112 to forward the remote user's extension to the virtual presence server 106, so that these calls can then be routed to the remote user's actual location. It is noted that the virtual presence server 106 automatically issues a command to the corporate PBX 112 to perform the remote call forwarding where possible. It is noted that most PBXs, as well as the TAPI (Telephony Application Programming Interface) from Microsoft and the TSAPI (Telephony Application Programming Interface) from Novell and AT&T, support remote call forwarding.

However, in embodiments where the PBX 112 does not support remote call forwarding, but rather has a master console, the PBX 112 is manually commanded to forward calls to the remote user. In one embodiment where the PBX 112 does not support remote call forwarding, a computer system is included between the virtual presence server 106 and the PBX 112. A human operator at the computer system receives a message from the virtual presence server 106 such as "please forward extension X to extension Y", and the operator manually enters commands to enable the call forwarding. Alternatively, the virtual presence server 106 includes a side path, such as a serial port, to the master console which enables remote call forwarding. However, it is noted that in the majority of instances the PBX 112 will generally support remote call forwarding, and in these instances the PBX 112 automatically routes calls to the virtual presence server 106, which then provides these calls to the remote user.

In one embodiment preferably used for telecommuters, the virtual presence server 106 also instructs the telephone company Central Office to automatically route all calls made to the remote user's home number to the user's corporate office phone number and/or the virtual presence server 106. Thus external parties who call the telecommuter's home phone number, i.e., personal calls, are routed to the corporate office, through the virtual presence server 106, and to the telecommuter at his home. The external party calling the telecommuter at his home will not be aware that the call was routed in this fashion.

If the remote user disconnects from the corporate office, or if the user is intentionally or unintentionally disconnected, then the reverse process to step 534 preferably occurs. In other words, the virtual presence server 106 automatically sends a message to the console to forward future messages back to the user's corporate office extension.

Also, after validation in step 532, in step 536 the virtual presence server transmits telephony control data to the remote computer system, as discussed above.

Figure 14:
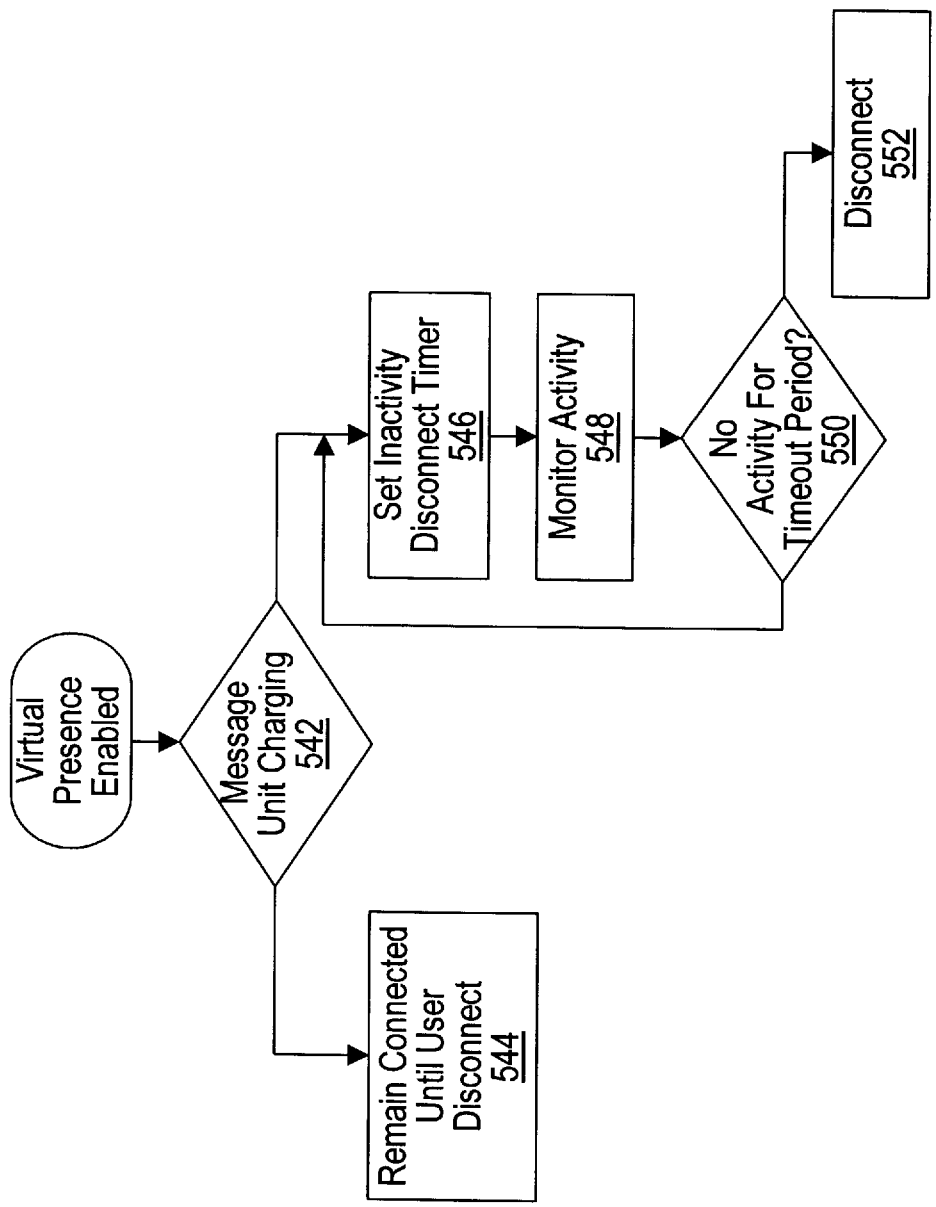
FIG. 14 is a flowchart diagram illustrating operation of the virtual presence server of the present invention.

FIG. 14—Connection Options

Referring now to FIG. 14, a flowchart diagram illustrating various connection options of the system of the present invention is shown. Once the remote computer system has established a connection to the virtual presence server 106, as described above with reference to FIGS. 12 and 13, in step 542 the virtual presence software operating in the remote computer system 102 preferably determines if message rate charging is in effect for the connection. In step 542 the remote computer system 102 determines if the corporate office and the remote user reside in a common Local Access Transport Area (LATA) that has no message unit transport charging. If so, then in step 544 the remote computer system 102 remains connected until the user manually disconnects, and thus the user preferably remains connected as long as desired. Thus, if the user resides within a local area code to the corporate office, and no message unit charging is in effect, the user preferably remains connected during the entire session, since there are no message unit charges.

If the corporate office and the remote user are determined in step 542 to not reside in a common Local Access Transport Area (LATA) and/or message unit transport charging is incurred, then in one embodiment the system of the present invention periodically disconnects during non-use or inactive periods to reduce connection expenses. In step 546 the virtual presence software sets an inactivity disconnect timer in the remote computer system. In step 548 the virtual presence software monitors the state of the timer as well as connection activity. Preferably, the timer counts down and generates an interrupt when the counter reaches 0. If in step 550 the virtual presence software determines that there has been no activity during the timeout period, then in step 552 the virtual presence software directs the remote computer system to disconnect from the virtual presence server 106. If activity has occurred during the timeout period, then operation returns to step 546, and the inactivity timer is reset. Thus, when connection activity occurs, the inactivity timer is reset accordingly and begins counting down.

Therefore, in one embodiment, a session established over long distance links or in areas where message unit charging is in effect is disconnected and reestablished based upon utilization in order to reduce costs. According to the present invention, the remote computer system includes a timer which is enabled during a session. The timer causes a link to be disconnected after a user determined period of no link activity. This type of disconnection is referred to as a "temporary disconnect" and is not apparent to the user. In the preferred embodiment, it is anticipated that the remote user will remain connected with a virtual presence at the corporate office for extended periods of time, regardless of any message unit charging.

The present invention also preferably operates to minimize LAN data traffic. ISDN is a message rate service where a user pays a set fee per minute. Bridges or routers between two LANs continually "ping" each other, asking each other if they are still connected to the network. In the preferred embodiment, the BO server 160 and the virtual presence server 106 perform spoofing to remove this traffic, as well as remove maintenance and overhead traffic.

Figure 15:
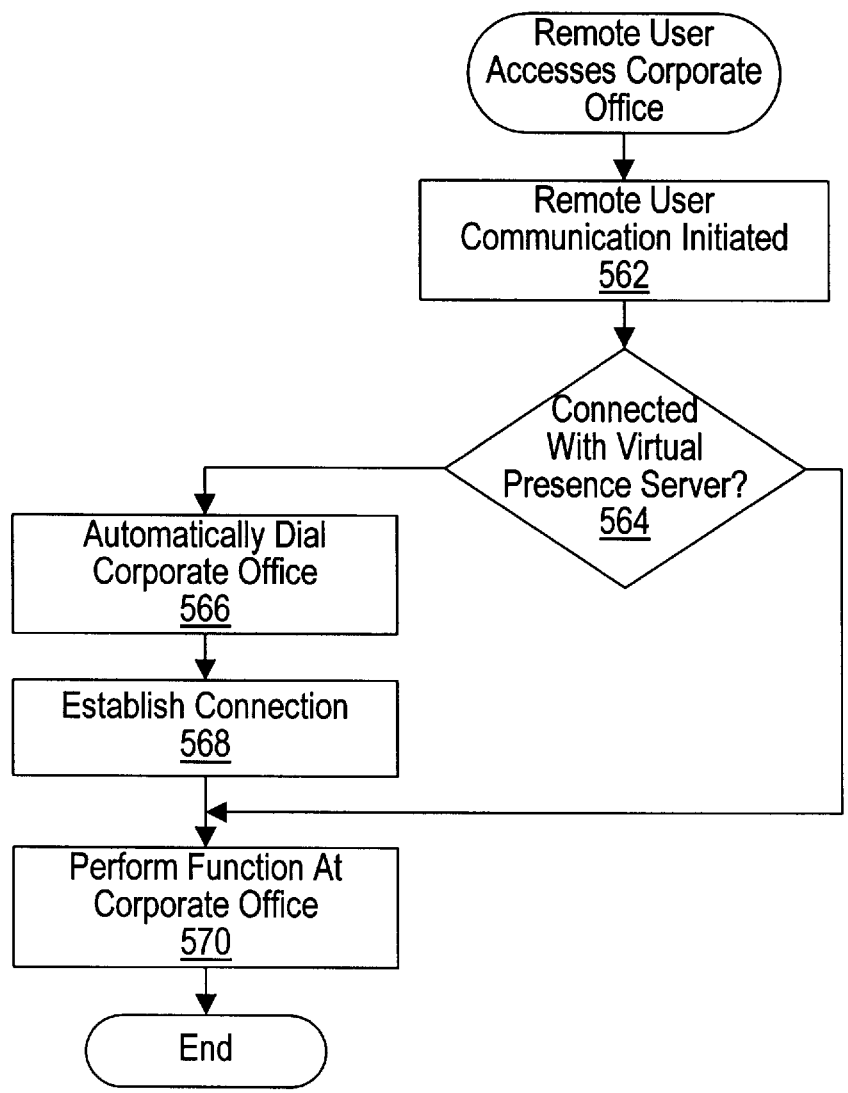
FIG. 15 is a flowchart diagram illustrating operation of the remote user accessing the corporate office.
Figure 16:
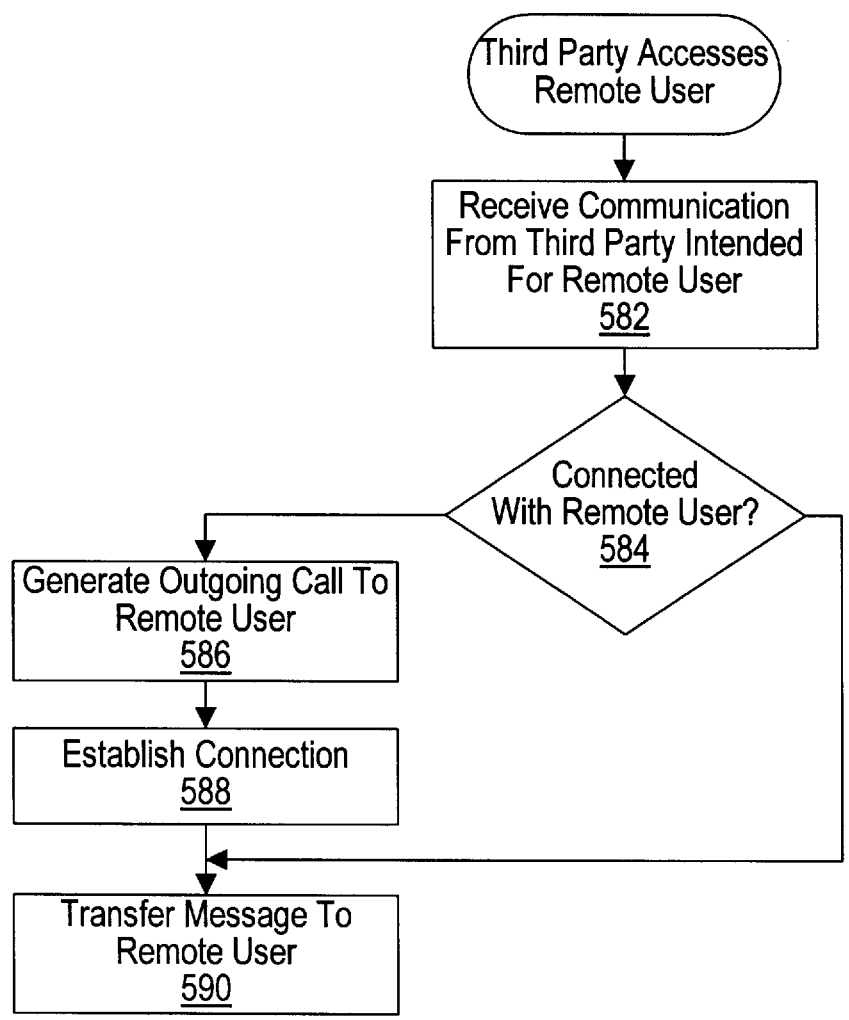
FIG. 16 is a flowchart diagram illustrating operation of the virtual presence server accessing the remote user.

FIGS. 15 and 16—Virtual Presence Operation

Referring now to FIG. 15 a flowchart diagram is shown illustrating operation of the present invention when the remote user accesses the corporate office. The flowchart of FIG. 15 presumes that virtual presence has been enabled as shown in step 510 of FIG. 12. In step 562 the remote user enables the communication device in the remote computer system 102. This may involve the user picking up the telephone connected to the remote computer system 102 or placing the virtual telephone "off-hook" to begin a telephone call. This may also involve the user initiating a modem or ISDN data transmission, initiating an Internet session, checking office email, etc.

In step 564 the virtual presence software executing on the remote computer system 102 determines if the remote computer system 102 is connected to the virtual presence server 106. If not, then in step 566 the virtual presence software automatically dials the corporate office. In step 568 the virtual presence software establishes a connection with the virtual presence server 106. Here it is noted that the connection is established as quickly as possible, and the security negotiations performed in step 504 of FIG. 12 are preferably not performed, with the possible exception of a reconnect password. In step 570 the remote computer system 102 performs the desired function at the corporate office, such as checking or sending email, calling an external party, or accessing the Internet, among others.

Referring now to FIG. 16 a flowchart diagram is shown illustrating operation of the present invention when a party at the corporate office or elsewhere accesses the remote user. The flowchart of FIG. 16 presumes that virtual presence has been enabled as shown in step 510 of FIG. 12. In step 582 the virtual presence server 106 receives a communication from a party intended for the remote computer system 102. This may involve a co-worker at the corporate office dialing the local extension of the remote user, an external person or external party calling the remote user from outside the corporate office, a party sending an email or fax to the remote user, or other forms of communication. This may also involve the third party initiating a modem or ISDN data transmission to the remote user.

In step 584 the virtual presence software executing on the virtual presence server 106 determines if the remote computer system 102 is connected to the virtual presence server 106. If not, then in step 586 the virtual presence server 106 automatically dials the remote computer system 102, i.e., establishes a connection or places a call to the remote computer system. Once the virtual presence server 106 at the corporate office connects to the remote user, the virtual presence server 106 "knows" the identity of the remote user. In step 588 the virtual presence server 106 establishes a connection with the remote computer system 102. Here it is noted that the connection is established as quickly as possible, and the security negotiations performed in step 504 of FIG. 12 are preferably not performed. In step 590 the virtual presence server 106 performs the desired function or transfer to the remote computer system 102, such as sending an email transmitted from a third party, transferring or forwarding a call made by a third party, forwarding a fax message received from a third party, among others.

In systems where inactivity disconnects occur, the virtual presence server 106 preferably generates special tones or uses other means to distinguish the virtual presence server 106 calling the remote user versus a call from a third party directly to the remote user. In the preferred embodiment, caller ID information is used by the virtual presence software executing on the remote computer system to distinguish between calls from the virtual presence server 106 and calls from third parties directly to the remote user's remote location. The caller ID information is used by the remote computer system 102 between the first and second ring before the receiving telephone has come off-hook. This allows the remote computer system to immediately determine if the call is from the virtual presence server 106 or from somebody else.

If the remote computer system does not have access to caller ID, the telephone at the remote site comes off-hook and waits for one second and then listens for special tones. In this embodiment, the virtual presence server 106 preferably generates special tones or unique identifying tones in a similar manner to the tones generated by a fax machine. In another embodiment, the virtual presence server 106 uses V8.bis, which provides for user-defined calling tone fields.

Therefore, after a temporary disconnect, any virtual presence access by the remote computer system 102, whether using the telephone, accessing the LAN, or other functions, causes the link to be automatically redialed by the virtual presence software executing in the remote computer system. This reduces message unit charging costs while preferably being transparent to the user. Likewise, any accesses by a third party intended for the remote user cause the virtual presence server 106 to automatically re-establish the connection with the remote computer system 102. After the reconnection, the third party communications are automatically directed to the remote user. Thus if the user picks up the telephone or engages the virtual telephone on the remote computer to initiate a call, and if a temporary disconnect has occurred, the remote computer system 102 automatically dials the virtual presence server 106 to reconnect. Also if a PBX extension at the corporate office and assigned to the remote computer system rings at the corporate office, and a temporary disconnect has occurred, the virtual presence server 106 at the corporate office automatically redials the remote computer system to reestablish the link. In this latter case, the virtual presence server 106 uses the telephone numbers provided by the remote virtual presence software at the beginning of the session and stored by the virtual presence server 106 during the initial session negotiation.

It is noted that, on an ISDN link, re-establishment of a connection after a temporary disconnect occurs very quickly and is typically less than a second. Thus on an ISDN link, re-establishment of a connection is generally transparent to the user. However, re-establishment of analog links using V.34 modems typically requires over 40 seconds. Thus, in an embodiment where analog phone lines are used, the automatic disconnect feature is noticeable and preferably not used.

Remote User Connected to Virtual Presence Server

The following describes operations wherein a remote user accesses data and/or performs communications using the virtual presence server 106 at the corporate office. Here it is assumed that the remote user desires to make a telephone call or otherwise communicate with a third party, wherein the remote user behaves just as if he were physically located at the corporate office.

As shown in FIG. 15, first in step 562 the remote user initiates a communication, i.e., picks up the telephone, or in some manner enables the telephone or modem to become "off-hook". For example, if the user is using a virtual telephone executing on the remote computer system, the user clicks a telephone call icon on the virtual telephone. If the remote user is connected to the virtual presence server 106 in step 564, or after a connection is established in step 568, then the following steps occur. In step 570 the corporate PBX 112 provides a dial tone to the remote user. The corporate PBX 112 provides the dial tone through the virtual presence server 106, through the public switched telephone network (PSTN) and through the open connection to the user's telephone instrument, or to the user's virtual telephone executing on the computer system 102. Thus the corporate PBX 112 provides the dial tone to the remote user's telephone, and the remote user acts as an extension to the corporate PBX 112.

If the user is performing a telephone call, then the user dials the desired number. If the remote user desires to talk to a co-worker at the corporate office, the remote user dials the coworker's three digit (or other type) extension. If the remote user dials a co-worker who is also a remote user that maintains a virtual presence, then the call is routed from the corporate office virtual presence server 106 to the co-worker remote user. If the remote user desires to talk to a third party using the corporate office WATTS line, the remote user dials just as if he/she were physically at the corporate office. Therefore, the telephone plugged into the remote computer system and/or the virtual telephone simulated by the remote office software appears as an extension on the corporate telephone system, i.e. the corporate PBX 112. The remote user also sends a fax or email, or logs on to the Internet, as if he were physically present at the corporate office.

Referring again to FIG. 16, when a telephone call is made to the user at the corporate office in step 582, then if the virtual presence connection is in place in step 584, or after the connection is established in step 588, in step 590 the PBX 112 and the virtual presence server 106 automatically route the call to the remote user. Thus, when a co-worker at the corporate office dials the local N digit extension of the remote user, which typically rings at the user's "corporate office" office, the telephone call is routed through the PBX 112 and provided through the virtual presence server 106 to the remote user at his/her remote location. The virtual presence server 106 provides the proper tones to the telephone of the remote user to direct the remote user's telephone to ring. The remote user then may pick up or answer the telephone and complete the connection. Likewise, a received email or fax is routed to the remote user in this fashion.

Therefore, once the remote user has been connected to the corporate office, the remote user operates substantially as if the user were physically present at the corporate office. To illustrate operation of the present invention, consider a user who works out of his home and also includes an office at the corporate office. If a user is engaged in a session with the virtual presence server 106 at the corporate office, or otherwise has informed the virtual presence server 106 that the user is physically located at his home, then when an external party attempts to call the user at the corporate office, the PBX telephone system 112 at the corporate office automatically routes the call to the user's home.

Thus, when an external party makes a telephone call to the corporate office to attempt to reach the user, the corporate PBX 112 automatically routes the telephone call through the session created by the user and the telephone rings at the remote computer 102, i.e. at the telephone plugged into the remote computer system or the virtual telephone simulated by the remote office software. Therefore, an external party calling the user is unable to detect whether the user is actually physically located in the corporate office or in a remote location with a virtual presence according to the present invention.

If the user and the external party are discussing a document and the external party desires to fax the document to the user, the external party faxes the document to the corporate office. If the user has a dedicated phone number for a personal fax at the corporate office, then the virtual presence server 106 of the present invention operates to automatically direct the fax from the corporate office to the user's home. In this case, the external party faxes the document to a fax machine, or to the fax number, at the corporate office which is connected to the virtual presence server 106, and the virtual presence server 106 detects that remote user as the receiving party of the fax and automatically redirects the fax transmission data from the corporate office fax machine to the remote user's home office.

Thus, according to the present invention, an external party calls the remote user at the corporate office and also faxes a document to the remote user at the corporate office, and both the telephone call and the fax document are automatically redirected to the user's home since the user is physically located at home. This occurs unbeknownst to the external party, who has every reason to believe that the user is physically located in the corporate office.

If the remote user at his home has established a "virtual presence" at the corporate office according to the invention, and desires to make a long distant telephone call to an external party located in a different area of the country, according to the present invention the user simply performs the dialing routine to access the corporate office WATTS line at the corporate office, just as if the remote user were physically located in the corporate office. Thus the remote user can obtain and use the corporate office WATTS line to make a long distance telephone call to an external party at a much reduced rate, just as if the user were physically located in the corporate office.

If a remote user is connected to the corporate office according to the virtual presence system of the invention, the user may be talking on the phone and simultaneously sending a fax. The remote user is also connected through a LAN bridge to the corporate LAN. If the remote user launches an application which expects to use a modem in one embodiment, this opens a channel to a the corporate office which then returns to use the remote user's modem. Thus, the modem located with the remote user is used in the application to dial the on-line service.

In one embodiment the remote user can access a modem from a modem server at the corporate office, and the modem at the corporate office acts as a slave to the remote user modem. Thus the modem at the corporate office performs desired communications, and the remote user's modem is only required for communications to and from the modem at the corporate office.

If a telecommuter desires to receive personal calls at home while connected to the virtual presence server, the telecommuter preferably instructs his friends and family to "call me at the office" to avoid a busy signal as a result of the virtual presence phone connection occupying the phone line. These calls are then routed to the telecommuter's home by the virtual presence server 106. Alternatively, the virtual presence server 106 and/or the user telephony communication device 104 instructs the telephone company Central Office to automatically route calls to the telecommuter's home number to the corporate office, and these calls are then routed to the telecommuter's home by the virtual presence server 106. Thus when a telecommuter is connected to the corporate office according to the virtual presence system of the invention, an external party who attempts to call the telecommuter at home is not blocked out, but rather is routed through the corporate office virtual presence server 106 to the telecommuter.

Thus the telecommuter is not required to have separate telephone lines for personal and business use, but rather is required to only have a single line for both personal and business communications. The single telephone line serves as the personal voice channel, the business voice channel, the corporate LAN data channel, and fax data channel.

When the user has completed operations and desires to terminate the session to the corporate office, the user preferably clicks on the "Be There" icon or enters a command at the operating system command line to terminate the remote virtual presence software.

Remote Access Call Forwarding

The present invention also provides a greatly improved system and interface for performing remote access call forwarding. In current systems, remote access call forwarding is not widely used due to the lack of a friendly user interface as well as the lack of a system which monitors the forwarding history and status of the user. The computer system 102 including the user telephony communication device 104 of the present invention provides an automated means for performing remote access call forwarding. The computer system 102 includes software which provides a friendly user interface that greatly simplifies remote access call forwarding. The computer system 102 also tracks the remote call forwarding status and history of the user, and thus remote access call forwarding can be easily undone. Also, the computer system 102 includes recovery methods for situations where a link has gone down and/or other instances occur where the remote access call forwarding should be done. Further, the computer system 102 includes authentication software as discussed above which provides the necessary security for remote access call forwarding.

Figure 17:
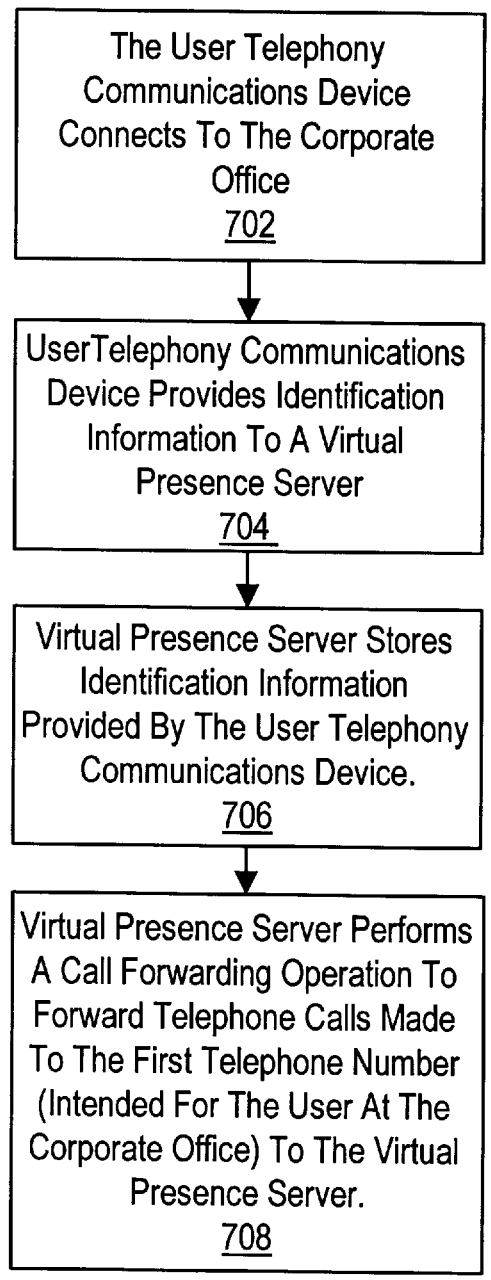
FIG. 17 is a flowchart diagram illustrating operation of the virtual presence system where the virtual presence server performs a call forwarding operation to forward the user's office extension telephone calls to the virtual presence server.
Figure 18:
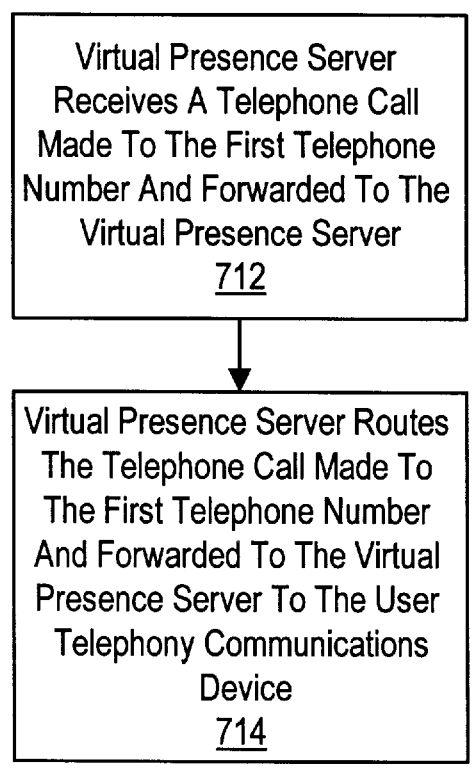
FIG. 18 is a flowchart diagram illustrating operation of the virtual presence server receiving a telephone call to the user's office extension and routing the call to the user's remote location.

FIGS. 17 and 18—Office Number Call Forwarding Operation

FIG. 17 illustrates a method for providing a remote user operating the user telephony communications device 104 with a virtual presence at a corporate office or data site. The corporate office or data site includes the virtual presence server 106 which routes communications between the corporate office and the telephony communications device 104. The corporate office or data site includes a first telephone number associated with the remote user, wherein the first telephone number is used to access the remote user at the corporate office or data site. In other words, the first telephone number is the user's office telephone number.

As shown, in step 702 the user telephony communications device 104 connects to the corporate office or data site. In step 704 the user telephony communications device 104 provides identification information to the virtual presence server 106 at the corporate office after connecting to the corporate office. The identification information includes an identity of the user operating the user telephony communications device 104. In step 706 the virtual presence server 106 stores the identification information provided by the user telephony communications device 104.

In step 708 the virtual presence server 106 performs a call forwarding operation to forward telephone calls made to the first telephone number which are intended for the user at the corporate office. The call forwarding operation directs the telephone calls made to the first telephone number to be forwarded to the virtual presence server 106. The virtual presence server performing the remote call forwarding operation includes the virtual presence server accessing the identification information received from the user telephony communications device 104 and then performing the remote call forwarding operation using the identification information.

Referring now to FIG. 18, when an external party calls the user at the office, i.e., dials the first telephone number to call the user at the office, the call forwarding operation performed in step 708 causes the telephone call to be received by the virtual presence server 106. As shown, in response to the call made to the first telephone number by the external party, in step 712 the virtual presence server 106 receives the telephone call made to the first telephone number and forwarded to the virtual presence server 106. In step 714 the virtual presence server 106 routes the telephone call made to the first telephone number and forwarded to the virtual presence server 106 to the user telephony communications device 104.

Thus the external party who calls the user at the office is automatically forwarded to the user at the remote location. For example, if the user is at home and is connected to the virtual presence server 106 at the corporate office, calls made to the user's office telephone number are forwarded to the user's home telephone number. Thus if the user telephony communications device 104 includes a second telephone number used to access the user telephony communications device 104, the virtual presence server 106 routes telephone calls made to the first telephone number to the second telephone number.

Figure 19:
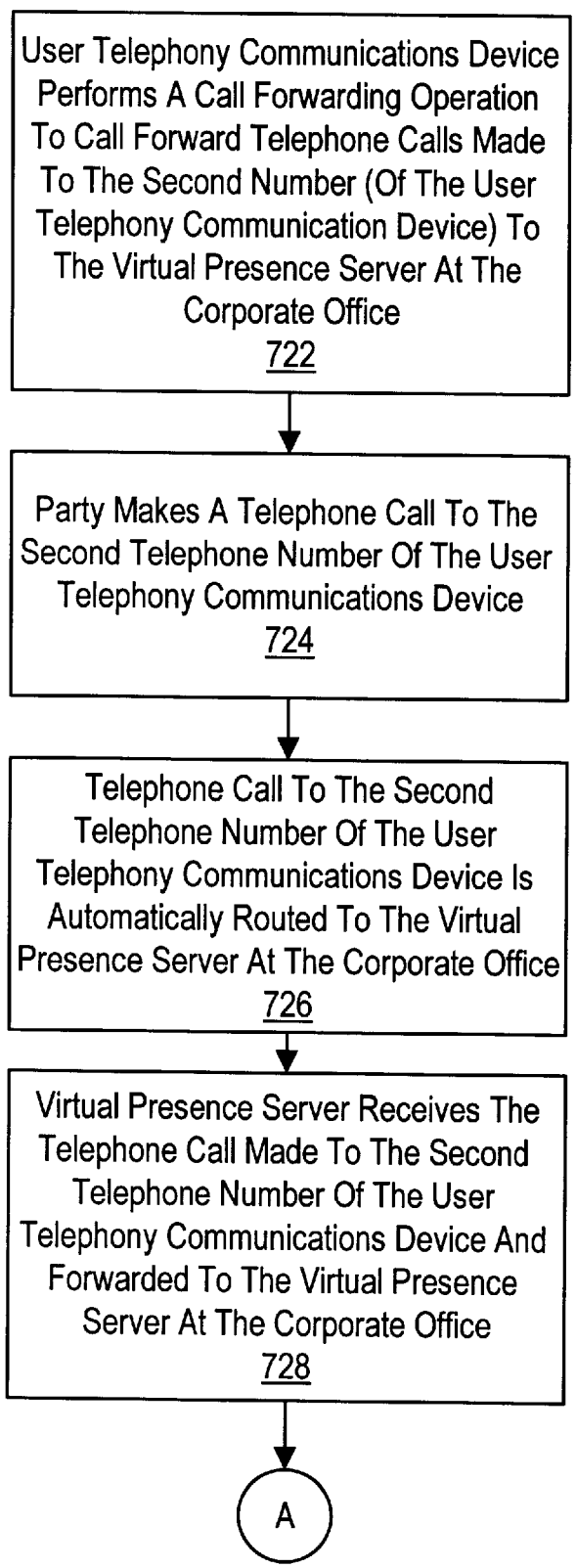
FIGS. 19 and 20 are a flowchart diagram illustrating operation of the virtual presence system where the system performs a call forwarding operation to forward calls from external parties through the virtual presence server to the user's remote location.
Figure 20:
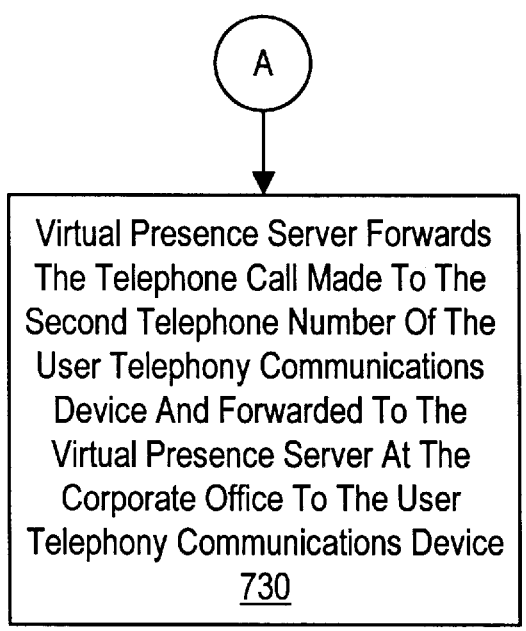

FIGS. 19 and 20—Remote Telephone Number Call Forwarding Operation

FIGS. 19 and 20 are a flowchart diagram illustrating operation of the invention in enabling the remote user to receive calls made to his telephone number while the user is connected to the virtual presence server 106 at the corporate office. Here it is assumed that the user telephony communications device 104 includes a second telephone number which is used to access the user telephony communications device 104. For example, if the remote user is a telecommuter, the second telephone number is the user's home number.

As shown, in step 722 the user telephony communications device 104 performs a call forwarding operation to call forward telephone calls made to the second number. The call forwarding operation causes telephone calls made to the second number to be forwarded to the virtual presence server 106. As discussed below, this enables telephone calls made to the second telephone number to be forwarded to the virtual presence server 106 and then routed through by the virtual presence server 106 to the user telephony communications device 104.

In another embodiment, in step 722 the virtual presence server 106 performs the call forwarding operation to call forward telephone calls made to the second number, causing calls made to the second number to be forwarded to the virtual presence server 106.

In the preferred embodiment, in step 722 the call forwarding operation directs telephone calls made to the second number to be forwarded to the first number at the corporate office. As noted above, calls intended for the first number at the corporate office are forwarded to the virtual presence server 106. Telephone calls intended for the first number at the corporate office are forwarded to the virtual presence server 106 due to the call forwarding operation performed in step 708. Thus, in this embodiment, telephone calls made to the second number are forwarded to the first number at the corporate office, and these calls forwarded to the first number at the corporate office are instead forwarded to the virtual presence server 106 due to the call forwarding operation of step 708.

After the call forwarding operation is performed in step 722, when an external party attempts to call the remote user at the remote location, e.g., attempts to call the telecommuter at home, the following occurs. As shown, in step 724, a party makes a telephone call to the second telephone number of the user telephony communications device. For example, if the remote user is a telecommuter, in step 724 a party makes a telephone call to the user's home.

In response to the call forwarding operation performed in step 722, in step 726 the telephone call to the second telephone number of the user telephony communications device 104 is automatically routed to the virtual presence server 106 at the corporate office. In step 728 the virtual presence server 106 receives the telephone call made to the second telephone number of the user telephony communications device 104 and forwarded to the virtual presence server 106 at the corporate office. In step 730 the virtual presence server 106 forwards or routes the telephone call made to the second telephone number of the user telephony communications device 104 and forwarded to the virtual presence server 106 at the corporate office to the user telephony communications device 104.

The virtual presence server 106 routes the telephone call to the user telephony communications device 104 on the same communication line or telephone line which is being used for the vial presence connection. Thus the single communication line is used for the virtual presence connection as well as for receiving home telephone calls routed in the above fashion.

Conclusion

Therefore, a system which enables a remote user to maintain a virtual presence at a corporate office is shown and described. The system of the present invention thus allows a remote user to connect to a corporate office and behave just as if the user were physically present at the corporate office.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for providing a remote user operating a user telephony communications device with access capabilities to a corporate office, wherein the corporate office includes a virtual presence server, wherein the corporate office includes a first telephone number associated with the remote user and used to access the remote user at the corporate office, the method comprising:

the user telephony communications device connecting to the corporate office on a communication line and providing identification information;

the virtual presence server performing a call forwarding operation to forward telephone calls made to said first telephone number which are intended for the user at the corporate office to said virtual presence server; and the virtual presence server communicating telephony control information with the user telephony communications device on the communication line, wherein said communicating telephony control information enables the user telephony communications device to behave as an extension to a telephony server at the corporate office;

wherein the virtual presence server performs said call forwarding operation and communicates said telephony control information in response to the user telephony communications device connecting to the corporate office and providing said identification information.

2. The method of claim 1, wherein calls made to said first telephone number which are intended for the user at the corporate office are forwarded to said virtual presence server and transmitted on the communication line to the user telephony communications device.

3. The method of claim 1, further comprising:

the virtual presence server receiving a telephone call made to said first telephone number and forwarded to said virtual presence server, wherein said telephone call is intended for the remote user operating said user telephony communications device; and the virtual presence server routing said telephone call made to said first telephone number and forwarded to said virtual presence server to the user telephony communications device on the communication line.

4. The method of claim 3, further comprising:

the user telephony communications device and the virtual presence server communicating voice information on the communication line after the virtual presence server routing said telephone call;

the virtual presence server performing data transfers with the user telephony communications device on the communication line during the user telephony communications device and the virtual presence server communicating said voice information.

5. The method of claim 1, wherein the virtual presence server communicates voice and telephony control information with the user telephony communications device on the communication line.

6. The method of claim 1, wherein the virtual presence server communicates voice, data and telephony control information with the user telephony communications device on the communication line.

7. The method of claim 1, further comprising:

the virtual presence server performing data transfers with the user telephony communications device on the communication line after the user telephony communications device connecting to the corporate office.

8. The method of claim 7, further comprising:

the virtual presence server routing electronic mail intended for the remote user to the user telephony communications device on the communication line after the user telephony communications device connecting to the corporate office.

9. The method of claim 7, further comprising:

the virtual presence server routing faxes intended for the remote user to the user telephony communications device on the communication line after the user telephony communications device connecting to the corporate office.

10. The method of claim 1, wherein the corporate office includes a local area network, wherein the virtual presence server is coupled to the local area network, the method further comprising:

the virtual presence server routing local area network data intended for the remote user to the user telephony communications device on the communication line after the user telephony communications device connecting to the corporate office.

11. The method of claim 1, wherein the user telephony communications device includes a second telephone number, wherein the second telephone number is used to access the user telephony communications device, the method further comprising:

performing a call forwarding operation to call forward telephone calls made to said second number to said virtual presence server;

wherein said telephone calls made to the second telephone number and forwarded to the virtual presence server are routed through said virtual presence server to said user telephony communications device on the communication line.

12. The method of claim 11, further comprising:

a party making a telephone call to the second telephone number of the user telephony communications device;

wherein said telephone call to the second telephone number of the user telephony communications device is automatically forwarded to the virtual presence server at the corporate office;

the virtual presence server receiving said telephone call made to the second telephone number of the user telephony communications device and forwarded to the virtual presence server at the corporate office;

the virtual presence server routing said telephone call made to the second telephone number of the user telephony communications device and forwarded to the virtual presence server at the corporate office to the user telephony communications device on the communication line.

13. The method of claim 11, wherein the virtual presence server automatically performs said call forwarding operation to call forward telephone calls made to said second number to said virtual presence server in response to the user telephony communications device connecting to the corporate office and providing said identification information.

14. The method of claim 1, wherein the user telephony communications device includes a second telephone number, wherein the second telephone number is used to access the user telephony communications device, the method further comprising:

instructing a telephone company central office to forward telephone calls made to the second telephone number to the virtual presence server at the corporate office;

wherein said telephone calls made to the second telephone number of the user telephony communications device and forwarded to the virtual presence server at the corporate office are routed through said virtual presence server to said user telephony communications device on the communication line.

15. The method of claim 14, wherein the virtual presence server automatically instructs said telephone company central office to forward telephone calls made to the second telephone number to the virtual presence server at the corporate office in response to the user telephony communications device connecting to the corporate office and providing said identification information.

16. The method of claim 14, wherein said instructing the telephone company central office comprises the virtual presence server performing a remote access call forwarding operation to forward telephone calls made to the second telephone number to the virtual presence server at the corporate office.

17. The method of claim 1, wherein the corporate office includes a corporate office telephone coupled to the telephony server and used by the remote user when the remote user is physically present in the corporate office;

wherein the user telephony communications device behaves substantially like said corporate office telephone in response to the virtual presence server communicating said telephony control information with the user telephony communications device.

18. The method of claim 1, further comprising:

the remote user calling a party using the communication line after said connecting and after the virtual presence server communicates telephony control information with said user telephony communications device, wherein said calling includes the user telephony communications device using said telephony control information to behave as an extension to the telephony server.

19. The method of claim 1, wherein the corporate office further includes a plurality of telephones coupled to said telephony server, wherein each of said plurality of telephones coupled to said telephony server have a local extension, the method further comprising:

the remote user calling a co-worker at the corporate office using the communication line after said connecting and after the virtual presence server communicates telephony control information with the user telephony communications device, wherein said calling the co-worker includes the remote user dialing a local extension of a telephone associated with said co-worker.

20. The method of claim 1, wherein said telephony control information includes one or more of message indications, line indications, and LCD display information.

21. The method of claim 1, wherein said identification information comprises an identity of the remote user operating the user telephony communications device.

22. The method of claim 1, further comprising:

the virtual presence server storing said identification information provided by the user telephony communications device;

wherein said virtual presence server performing said call forwarding operation includes:

accessing said identification information received from said user telephony communications device; and performing said call forwarding operation using said identification information.

23. The method of claim 1, further comprising:

the user telephony communications device disconnecting from the corporate office;

the virtual presence server performing a discontinue operation to discontinue said call forwarding operation in response to said disconnecting;

wherein after said discontinue operation telephone calls made to said first telephone number which are intended for the user at the corporate office are received by a telephony device at the corporate office associated with said first telephone number.

24. The method of claim 1, wherein the virtual presence server performing said call forwarding operation comprises the virtual presence server instructing the telephony server at the corporate office to forward telephone calls made to said first telephone number which are intended for the user at the corporate office to said virtual presence server.

25. The method of claim 24, further comprising:

the user telephony communications device disconnecting from the corporate office;

the virtual presence server instructing the telephony server at the corporate office to discontinue said call forwarding operation;

wherein, after the telephony server at the corporate office discontinues said call forwarding operation, telephone calls made to said first telephone number which are intended for the user at the corporate office are received by the telephony server and not forwarded to the virtual presence server.

26. The method of claim 1, wherein the virtual presence server is also said telephony server.

27. A system which provides a remote user with access capabilities to a corporate office, comprising:

a user telephony communications device physically located remotely from the corporate office, wherein the user telephony communications device is operated by the remote user, wherein the user telephony communications device is adapted for coupling to a transmission medium, wherein the user telephony communications device transmits communications to the corporate office on the transmission medium, wherein said communications include identification information;

a telephony server located at the corporate office, wherein the telephony server controls a plurality of telephones, wherein the corporate office includes a first telephone number associated with the remote user, wherein the first telephone number is used to access the remote user at the corporate office; and a virtual presence server located at the corporate office and coupled to said telephony server, wherein the user telephony communications device is operable to connect to the virtual presence server, wherein the virtual presence server includes:

at least one input for coupling to the transmission medium, wherein said at least one input receives communications from said user telephony communications device on the transmission medium;

a memory for storing said identification information received from said user telephony communications device; and a communication device coupled to said memory and to said at least one input for communicating with the user telephony communications device on the transmission medium;

wherein the virtual presence server is operable to perform a call forwarding operation to forward telephone calls made to said first telephone number which are intended for the user at the corporate office to said virtual presence server;

wherein the virtual presence server is operable to route said telephone calls made to said first telephone number and forwarded to said virtual presence server to the user telephony communications device on the transmission medium;

wherein the virtual presence server is operable to communicate telephony control information with the user telephony communications device on the transmission medium, wherein said telephony control information enables the user telephony communications device to behave as an extension to the telephony server at the corporate office; and wherein the virtual presence server is operable to perform said call forwarding operation and communicate said telephony control information in response to the user telephony communications device connecting to the corporate office and providing said identification information.

28. The system of claim 27, wherein the virtual presence server is operable to receive a telephone call made to said first telephone number and forwarded to said virtual presence server, wherein said telephone call is intended for the remote user operating said user telephony communications device; and wherein the virtual presence server is operable to route said telephone call to said user telephony communications device through the transmission medium.

29. The system of claim 27, wherein the user telephony communications device and the virtual presence server are operable to simultaneously communicate voice and data information on the transmission medium.

30. The system of claim 27, wherein said virtual presence server further includes:

processing logic for accessing said identification information received from said user telephony communications device; and call forwarding logic for performing said call forwarding operation using said identification information.

31. The system of claim 27, wherein the virtual presence server is operable to perform data transfers with the user telephony communications device on the transmission medium after the user telephony communications device connects to the corporate office.

32. The system of claim 31, wherein the virtual presence server is operable to route electronic mail intended for the remote user to the user telephony communications device on the transmission medium after the user telephony communications device connects to the corporate office.

33. The system of claim 31, wherein the virtual presence server is operable to route faxes intended for the remote user to the user telephony communications device on the transmission medium after the user telephony communications device connects to the corporate office.

34. The system of claim 27, further comprising:

a local area network located at the corporate office, wherein the virtual presence server is coupled to the local area network;

wherein the virtual presence server is operable to route local area network data intended for the remote user to the user telephony communications device after the user telephony communications device connects to the corporate office.

35. The system of claim 27, wherein the user telephony communications device includes a second telephone number, wherein the second telephone number is used to access the user telephony communications device;

wherein the virtual presence server is operable to perform a call forwarding operation to call forward telephone calls made to said second number to said virtual presence server at the corporate office;

wherein the virtual presence server is operable to route said telephone calls made to the second telephone number and forwarded to the virtual presence server to said user telephony communications device on the transmission medium.

36. The system of claim 27, wherein the corporate office includes a corporate office telephone coupled to the telephony server and used by the remote user when the remote user is physically present in the corporate office;

wherein the user telephony communications device behaves substantially like said corporate office telephone in response to said telephony control information.

37. The system of claim 27, wherein the corporate office further includes a plurality of telephones coupled to said telephony server, wherein each of said plurality of telephones coupled to said telephony server have a local extension;

wherein the user telephony communications device is operable to call a co-worker at the corporate office through the transmission medium by dialing a local extension of a telephone associated with said co-worker.

38. The system of claim 27, wherein said telephony control information includes one or more of message indications, line indications, and LCD display information.

39. The system of claim 27, wherein the user telephony communications device is operable to disconnect from the corporate office;

wherein, in response to the user telephony communications device disconnecting from the corporate office, the virtual presence server performs a discontinue operation to discontinue said call forwarding operation;

wherein after said discontinue operation telephone calls made to said first telephone number which are intended for the user at the corporate office are received by a telephony device at the corporate office associated with said first telephone number.

40. The system of claim 27, wherein the virtual presence server is operable to perform said call forwarding operation by instructing the telephony server at the corporate office to forward telephone calls made to said first telephone number which are intended for the user at the corporate office to said virtual presence server.

41. The system of claim 40,
wherein the user telephony communications device is operable to disconnect from the corporate office;
wherein, in response to the user telephony communications device disconnecting from the corporate office, the virtual presence server is operable to instruct the telephony server at the corporate office to discontinue said call forwarding operation;
wherein, after the telephony server at the corporate office discontinues said call forwarding operation, telephone calls made to said first telephone number which are intended for the user at the corporate office are received by the telephony server and not forwarded to the virtual presence server.

42. A system which provides a remote user with access capabilities to a corporate office, wherein the system is located at the corporate office, wherein the remote user operates a user telephony communications device physically located remotely from the corporate office, wherein the corporate office includes a first telephone number associated with the remote user, wherein the first telephone number is used to access the remote user at the corporate office, wherein the system includes:
at least one input for coupling to a transmission medium, wherein said at least one input receives communications from the user telephony communications device on the transmission medium;
a memory for storing identification information received from the user telephony communications device; and
a communication device coupled to the memory and to the at least one input for communicating voice and data information to the user telephony communications device on the transmission medium;
wherein the system is operable to perform a call forwarding operation to forward telephone calls made to said first telephone number which are intended for the user at the corporate office to said system;
wherein the system is operable to route said telephone calls made to said first telephone number and forwarded to said system to the user telephony communications device on the transmission medium;
wherein the system is operable to communicate telephony control information with the user telephony communications device on the transmission medium, wherein said telephony control information enables the user telephony communications device to behave as an extension to a telephony server at the corporate office; and
wherein the system is operable to perform said call forwarding operation and communicate said telephony control information in response to the system receiving a communication from the user telephony communications device and receiving said identification information from the user telephony communications device.

43. The system of claim 42,
wherein the system at the corporate office is operable to receive a telephone call intended for said first telephone number, wherein said telephone call is intended for the remote user operating the user telephony communications device; and
wherein the system is operable to route said telephone call to the user telephony communications device through the transmission medium in response to the system receiving said telephone call.

44. The system of claim 42,
wherein the system is operable to simultaneously communicate voice and data information to the user telephony communications device through the transmission medium.

45. The system of claim 42, wherein said system further includes:
processing logic for accessing said identification information received from the user telephony communications device; and
call forwarding logic for performing said call forwarding operation using said identification information.

46. The system of claim 42, wherein the system is operable to perform data transfers with the user telephony communications device through the transmission medium after the system receives a connection from the user telephony communications device.

47. The system of claim 46, wherein the system is operable to route electronic mails intended for the remote user to the user telephony communications device through the transmission medium after the system receives a connection from the user telephony communications device.

48. The system of claim 46, wherein the system is operable to route faxes intended for the remote user to the user telephony communications device through the transmission medium after the system receives a connection from the user telephony communications device.

49. The system of claim 42, wherein a local area network is located at the corporate office, wherein the system is coupled to the local area network;
wherein the system is operable to route local area network data intended for the remote user to the user telephony communications device through the transmission medium after the system receives a connection from the user telephony communications device.

50. The system of claim 42, wherein the user telephony communications device includes a second telephone number, wherein the second telephone number is used to access the user telephony communications device;
wherein the system is operable to perform a call forwarding operation to call forward telephone calls made to said second number to said system at the corporate office;
wherein the system is operable to route said telephone calls made to the second telephone number and forwarded to the system to the user telephony communications device through the transmission medium.

51. The system of claim 42, wherein the corporate office includes a corporate office telephone used by the remote user when the remote user is physically present in the corporate office;
wherein the user telephony communications device behaves substantially like said corporate office telephone in response to said telephony control information.

52. The system of claim 42,
wherein the corporate office further includes a plurality of telephones, wherein each of said plurality of telephones have a local extension;

wherein the user telephony communications device is operable to call a co-worker at the corporate office through the transmission medium by dialing a local extension of a telephone associated with said co-worker.

53. The system of claim 42, wherein said telephony control information includes one or more of message indications, line indications, and LCD display information.

54. The system of claim 42,
wherein, in response to the user telephony communications device disconnecting from the corporate office, the system performs a discontinue operation to discontinue said call forwarding operation;
wherein after said discontinue operation telephone calls made to said first telephone number which are intended for the user at the corporate office are received by a telephony device at the corporate office associated with said first telephone number.

55. The system of claim 42, wherein the system is operable to perform said call forwarding operation by instructing the telephony server at the corporate office to forward telephone calls made to said first telephone number which are intended for the user at the corporate office to said system.

56. The system of claim 55,
wherein, in response to the user telephony communications device disconnecting from the corporate office, the system is operable to instruct the telephony server at the corporate office to discontinue said call forwarding operation;
wherein, after the telephony server at the corporate office discontinues said call forwarding operation, telephone calls made to said first telephone number which are intended for the user at the corporate office are received by the telephony sever and not forwarded to the virtual presence server.

57. The system of claim 42, wherein the system operates as the telephony server at the corporate office.

58. A method for providing a remote user operating a user telephony communications device with access capabilities to a corporate office, wherein the corporate office includes a virtual presence server, wherein the corporate office includes a first telephone number associated with the remote user, wherein the first telephone number is used to access the remote user at the corporate office, wherein the user telephony communications device includes a second telephone number, wherein the second telephone number is used to access the user telephony communications device, the method comprising:
the user telephony communications device connecting to the corporate office;
the user telephony communications device providing identification information to the virtual presence server at the corporate office, said identification information including an identity of the remote user operating the user telephony communications device;
the virtual presence server performing a call forwarding operation to forward telephone calls made to said first telephone number which are intended for the user at the corporate office to said virtual presence server;
performing a call forwarding operation to call forward telephone calls made to said second number to said virtual presence server;
wherein said telephone calls forwarded to the virtual presence server are routed through said virtual presence server to said user telephony communications device; and
wherein said call forwarding operations are performed in response to the user telephony communications device connecting to the corporate office and providing said identification information.

59. The method of claim 58, wherein the virtual presence server performing said call forwarding operation to forward telephone calls made to said first telephone number which are intended for the user at the corporate office to said virtual presence server comprises the virtual presence server instructing a telephony server at the corporate office to forward telephone calls made to said first telephone number which are intended for the user at the corporate office to said virtual presence server.

60. The method of claim 58,
wherein said performing a call forwarding operation to call forward telephone calls made to said second number to said virtual presence server comprises instructing a telephone company central office to forward telephone calls made to the second telephone number to the virtual presence server at the corporate office.

61. The method of claim 58, further comprising:
the virtual presence server routing a telephone call made to said first telephone number and forwarded to said virtual presence server to the user telephony communications device.

62. The method of claim 58, further comprising:
the virtual presence server receiving a telephone call made to said first telephone number and forwarded to said virtual presence server, wherein said telephone call is intended for the user operating said user telephony communications device; and
the virtual presence server routing said telephone call made to said first telephone number and forwarded to said virtual presence server to the user telephony communications device.

63. The method of claim 62, further comprising:
the user telephony communications device and the virtual presence server communicating voice information after the virtual presence server routing said telephone call;
the virtual presence server performing data transfers with the user telephony communications device during the user telephony communications device and the virtual presence server communicating said voice information.

64. The method of claim 58, further comprising:
a party making a telephone call to the second telephone number of the user telephony communications device;
wherein said telephone call to the second telephone number of the user telephony communications device is automatically forwarded to the virtual presence server at the corporate office;
the virtual presence server receiving said telephone call made to the second telephone number of the user telephony communications device and forwarded to the virtual presence server at the corporate office;
the virtual presence server routing said telephone call made to the second telephone number of the user telephony communications device and forwarded to the virtual presence server at the corporate office to the user telephony communications device.

65. The method of claim 58, wherein said virtual presence server performing said call forwarding operations includes:
accessing said identification information received from said user telephony communications device; and
performing said call forwarding operations using said identification information.

66. The method of claim 58, further comprising:

the virtual presence server performing data transfers with the user telephony communications device after the user telephony communications device connecting to the corporate office.

67. The method of claim 66, further comprising:

the virtual presence server routing electronic mail intended for the remote user to the user telephony communications device after the user telephony communications device connecting to the corporate office.

68. The method of claim 66, further comprising:

the virtual presence server routing faxes intended for the remote user to the user telephony communications device after the user telephony communications device connecting to the corporate office.

69. The method of claim 58, wherein the corporate office includes a local area network, wherein the virtual presence server is coupled to the local area network, the method further comprising:

the virtual presence server routing local area network data intended for the remote user to the user telephony communications device after the user telephony communications device connecting to the corporate office.

70. The method of claim 58, wherein the corporate office includes a telephony server, the method further comprising:

the virtual presence server communicating telephony control information with the user telephony communications device, wherein said communicating telephony control information enables the user telephony communications device to behave as an extension to the telephony server at the corporate office.

71. The method of claim 70, wherein the virtual presence server communicates said telephony control information with the user telephony communications device in response to the user telephony communications device connecting to the corporate office and providing said identification information.

72. The method of claim 70, wherein the corporate office includes a corporate office telephone coupled to the telephony server and used by the remote user when the remote user is physically present in the corporate office;

wherein the user telephony communications device behaves substantially like said corporate office telephone in response to the virtual presence server communicating said telephony control information with the user telephony communications device.

73. The method of claim 70, further comprising:

the remote user calling a party after said connecting and after the virtual presence server communicates telephony control information with said user telephony communications device, wherein said calling includes the user telephony communications device using said telephony control information to behave as an extension to the telephony server.

74. The method of claim 70, wherein the corporate office further includes a plurality of telephones coupled to said telephony server, wherein each of said plurality of telephones coupled to said telephony server have a local extension, the method further comprising:

the remote user calling a co-worker at the corporate office after said connecting and after the virtual presence server communicates telephony control information with the user telephony communications device, wherein said calling the co-worker includes the remote user dialing a local extension of a telephone associated with said co-worker.

75. The method of claim 70, wherein said telephony control information includes one or more of message indications, line indications, and LCD display information.

76. The method of claim 58, further comprising:

the user telephony communications device disconnecting from the corporate office;

the virtual presence server performing one or more discontinue operations to discontinue said call forwarding operations in response to said disconnecting;

wherein after said discontinue operations telephone calls made to said first telephone number which are intended for the user at the corporate office are received by a telephony device at the corporate office associated with said first telephone number, and telephone calls made to said second telephone number which are intended for the user telephony communications device are received by the user telephony communications device.

77. The method of claim 76, wherein said discontinue operations comprise instructing a telephony server at the corporate office to discontinue forwarding telephone calls made to said first telephone number which are intended for the user at the corporate office to said virtual presence server and instructing a telephone company central office to discontinue forwarding telephone calls made to the second telephone number to the virtual presence server at the corporate office.

78. A system which provides a remote user with access capabilities to a corporate office, wherein the system is located at the corporate office, wherein the remote user operates a user telephony communications device physically located remotely from the corporate office, wherein the corporate office includes a first telephone number associated with the remote user, wherein the first telephone number is used to access the remote user at the corporate office, wherein the user telephony communications device includes a second telephone number, wherein the second telephone number is used to access the user telephony communications device, wherein the system includes:

at least one input for coupling to a transmission medium, wherein said at least one input receives communications from the user telephony communications device;

a memory for storing identification information received from the user telephony communications device; and a communication device coupled to the memory and to the at least one input for communicating with the user telephony communications device;

wherein the system is operable to perform a call forwarding operation to forward telephone calls made to said first telephone number which are intended for the user at the corporate office to said system;

wherein the system is operable to perform a call forwarding operation to call forward telephone calls made to said second number to said system;

wherein said telephone calls forwarded to the system are routed through said system to said user telephony communications device; and wherein the system performs said call forwarding operations in response to the user telephony communications device connecting to the corporate office and providing said identification information.

79. The system of claim 78, wherein said call forwarding operation to forward telephone calls made to said first telephone number which are intended for the user at the corporate office to said system comprises instructing a telephony server at the corporate office to forward telephone calls made to said first telephone number which are intended for the user at the corporate office to said system.

80. The system of claim 78,
   wherein said call forwarding operation to call forward telephone calls made to said second number to said system comprises instructing a telephone company central office to forward telephone calls made to the second telephone number to the system.

81. The system of claim 78,
   wherein the system at the corporate office is operable to receive a telephone call intended for said first telephone number, wherein said telephone call is intended for the remote user operating the user telephony communications device; and
   wherein the system is operable to route said telephone call to the user telephony communications device in response to the system receiving said telephone call.

82. The system of claim 78,
   wherein, in response to a party making a telephone call to the second telephone number of the user telephony communications device, said telephone call to the second telephone number of the user telephony communications device is automatically forwarded to the system at the corporate office;
   wherein the system is operable to receive said telephone call made to the second telephone number of the user telephony communications device and forwarded to the system at the corporate office;
   wherein the system is operable to route said telephone call made to the second telephone number of the user telephony communications device and forwarded to the system at the corporate office to the user telephony communications device.

83. The system of claim 78, wherein said system further includes:
   processing logic for accessing said identification information received from the user telephony communications device; and
   call forwarding logic for performing said call forwarding operation using said identification information.

84. The system of claim 78, wherein the system is operable to perform data transfers with the user telephony communications device after the system receives a connection from the user telephony communications device.

85. The system of claim 84, wherein the system is operable to route electronic mails intended for the remote user to the user telephony communications device after the system receives a connection from the user telephony communications device.

86. The system of claim 84, wherein the system is operable to route faxes intended for the remote user to the user telephony communications device after the system receives a connection from the user telephony communications device.

87. The system of claim 78, wherein a local area network is located at the corporate office, wherein the system is coupled to the local area network;
   wherein the system is operable to route local area network data intended for the remote user to the user telephony communications device after the system receives a connection from the user telephony communications device.

88. The system of claim 78,
   wherein the system is operable to communicate telephony control information with the user telephony communications device, wherein said telephony control information enables the user telephony communications device to behave as an extension to a telephony server at the corporate office.

89. The system of claim 88, wherein the system is operable to communicate said telephony control information with the user telephony communications device in response to the system receiving a communication from the user telephony communications device and receiving said identification information from the user telephony communications device.

90. A method for providing a remote user operating a user telephony communications device with access capabilities to a corporate office, wherein the corporate office includes a virtual presence server, the method comprising:
   the user telephony communications device connecting to the corporate office on a communication line and providing identification information; and
   the virtual presence server communicating telephony control information with the user telephony communications device on the communication line, wherein said communicating telephony control information enables the user telephony communications device to behave as an extension to a telephony server at the corporate office;
   wherein the virtual presence server communicates said telephony control information on the communication line in response to the user telephony communications device connecting to the corporate office and providing said identification information.

91. The method of claim 90, wherein the corporate office includes a corporate office telephone coupled to the telephony server and used by the remote user when the remote user is physically present in the corporate office;
   wherein the user telephony communications device behaves substantially like said corporate office telephone in response to the virtual presence server communicating said telephony control information with the user telephony communications device.

92. The method of claim 90, further comprising:
   the remote user calling a party after said connecting and after the virtual presence server communicates telephony control information with said user telephony communications device, wherein said calling includes the user telephony communications device using said telephony control information to behave as an extension to the telephony server.

93. The method of claim 90, wherein the corporate office further includes a plurality of telephones coupled to said telephony server, wherein each of said plurality of telephones coupled to said telephony server have a local extension, the method further comprising:
   the remote user calling a co-worker at the corporate office after said connecting and after the virtual presence server communicates telephony control information with the user telephony communications device, wherein said calling the co-worker includes the remote user dialing a local extension of a telephone associated with said co-worker.

94. The method of claim 90, wherein said telephony control information includes one or more of message indications, line indications, and LCD display information.

95. The method of claim 90, wherein the corporate office includes a first telephone number associated with the remote user and used to access the remote user at the corporate office;

wherein calls made to said first telephone number which are intended for the user at the corporate office are automatically routed on the communication line to the user telephony communications device.

96. The method of claim 95, further comprising:

the corporate office receiving a telephone call made to said first telephone number, wherein said telephone call is intended for the remote user operating said user telephony communications device; and automatically routing said telephone call made to said first telephone number to the user telephony communications device on the communication line, wherein said automatically routing is performed in response to the user telephony communications device connecting to the corporate office and providing said identification information.

97. The method of claim 96, further comprising:

the user telephony communications device and the virtual presence server communicating voice information on the communication line after said automatically routing said telephone call;

the virtual presence server performing data transfers with the use telephony communications device on the communication line during the user telephony communications device and the virtual presence server communicating said voice information.

98. The method of claim 96, wherein the virtual presence server communicates voice and telephony control information with the user telephony communications device on the communication line.

99. The method of claim 96, wherein the virtual presence server communicates voice, data and telephony control information with the user telephony communications device on the communication line.

* * * * *